(12) United States Patent
Must et al.

(10) Patent No.: US 11,479,413 B2
(45) Date of Patent: Oct. 25, 2022

(54) AUTOMATED OUTDOOR TERMINAL FOR STORAGE AND HANDOVER OF ONLINE ORDERS AND A METHOD TO OPERATE THE TERMINAL

(71) Applicant: Cleveron AS, Viljandi (EE)

(72) Inventors: Tarmo Must, Viljandi (EE); Mihkel Ilp, Tartu vald (EE); Arno Kütt, Viljandi parish (EE); Harry Nuudi, Karksi-Nuia (EE); Rein Saetalu, Põhja-Sakala vald (EE)

(73) Assignee: Cleveron AS, Viljandi (EE)

( * ) Notice: Subject to any disclaimer, the term of this patent is extended or adjusted under 35 U.S.C. 154(b) by 277 days.

(21) Appl. No.: 16/872,170

(22) Filed: May 11, 2020

(65) Prior Publication Data

US 2020/0361711 A1 Nov. 19, 2020

Related U.S. Application Data

(60) Provisional application No. 62/847,813, filed on May 14, 2019.

(51) Int. Cl.
| | |
|---|---|
| *G06F 7/00* | (2006.01) |
| *B65G 1/137* | (2006.01) |
| *G06F 16/23* | (2019.01) |
| *B65D 88/74* | (2006.01) |
| *B65G 1/04* | (2006.01) |

(Continued)

(52) U.S. Cl.
CPC .......... *B65G 1/1378* (2013.01); *B65D 88/74* (2013.01); *B65G 1/0435* (2013.01); *B65G 1/065* (2013.01); *B65G 1/12* (2013.01); *B65G 1/1371* (2013.01); *B65G 47/92* (2013.01); *B66F 9/063* (2013.01); *B66F 9/186* (2013.01);

*F25D 25/00* (2013.01); *G05B 19/4155* (2013.01); *G06F 16/23* (2019.01); *G06Q 10/087* (2013.01); *G06Q 20/18* (2013.01); *G06Q 50/28* (2013.01);

(Continued)

(58) Field of Classification Search
CPC .... B65G 1/1378; B65G 1/0435; B65G 1/065; B65G 1/12; B65G 1/1371; B65G 47/92; B65G 2201/0258; B65G 1/0492; B65G 1/1373; B65G 2203/0233; B65G 2203/04; B65D 88/74; B66F 9/063; B66F 9/186; F25D 25/00; G05B 19/4155; G05B 2219/40062; G06F 16/23; G06Q 10/087; G06Q 20/18; G06Q 50/28; G07F 11/165; G07F 11/42; G07F 11/62; G07F 17/0064; G07F 17/0092; G07F 17/12
USPC .................. 700/213–216, 223, 228, 231
See application file for complete search history.

(56) References Cited

U.S. PATENT DOCUMENTS

| | | |
|---|---|---|
| 6,467,293 B1 | 10/2002 | Goosman |
| 7,054,832 B1 | 5/2006 | Vallabh |

(Continued)

FOREIGN PATENT DOCUMENTS

| | | |
|---|---|---|
| EP | 1972874 A2 | 9/2008 |
| EP | 1972874 A3 | 3/2010 |

(Continued)

*Primary Examiner* — Yolanda R Cumbess
(74) *Attorney, Agent, or Firm* — Meunier Carlin & Curfman LLC

(57) ABSTRACT

An automated temperature-controlled outdoor terminal for storage and handover of online grocery orders allowing simultaneous operation of two transactions and a method to operate the terminal is described here.

12 Claims, 21 Drawing Sheets

Figure 1:
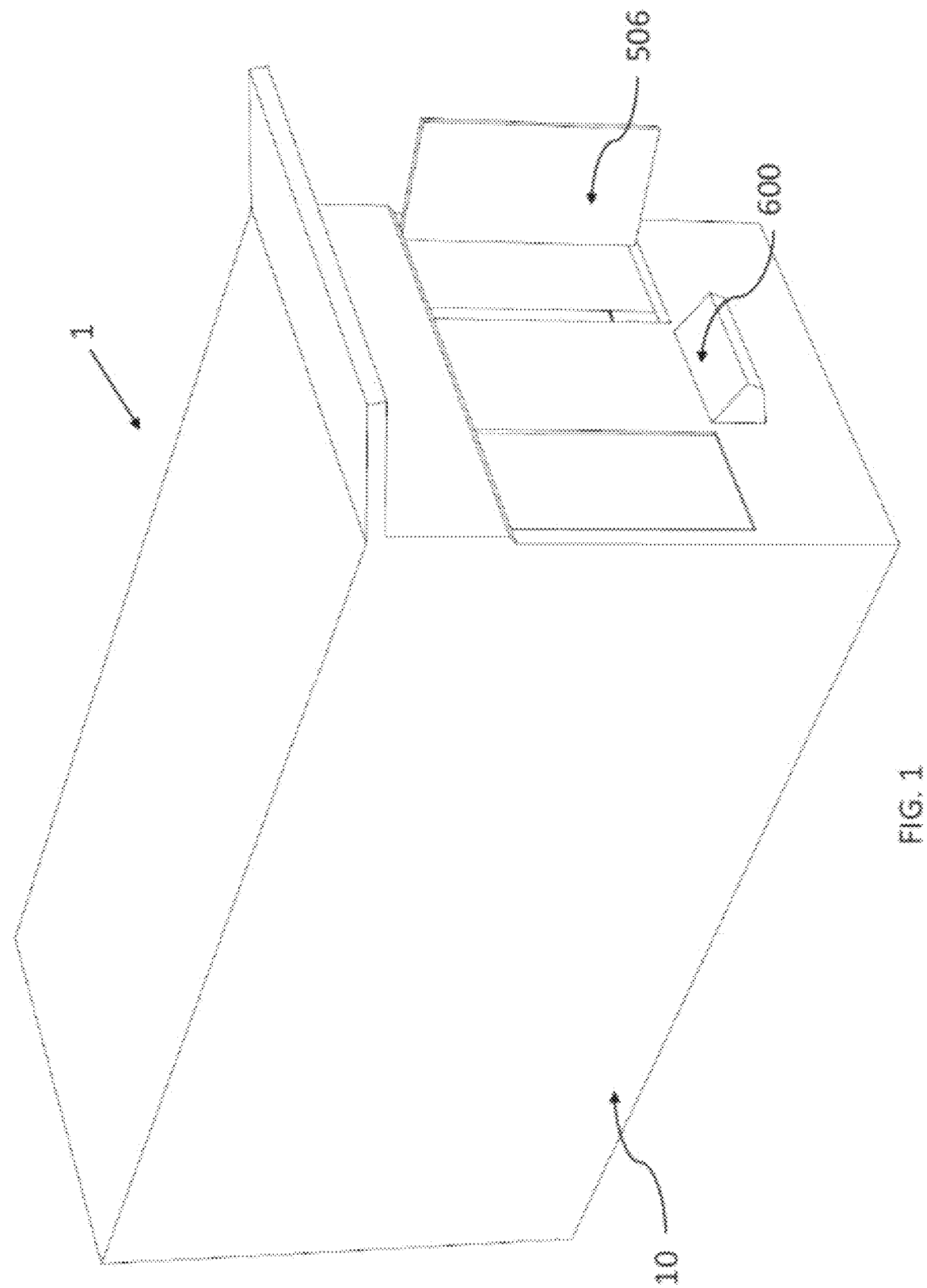

(51) Int. Cl.
  *B65G 1/06*     (2006.01)
  *B65G 1/12*     (2006.01)
  *B65G 47/92*    (2006.01)
  *B66F 9/06*     (2006.01)
  *B66F 9/18*     (2006.01)
  *F25D 25/00*    (2006.01)
  *G05B 19/4155*  (2006.01)
  *G06Q 10/08*    (2012.01)
  *G06Q 20/18*    (2012.01)
  *G06Q 50/28*    (2012.01)

(52) U.S. Cl.
  CPC ............ *B65G 2201/0258* (2013.01); *G05B 2219/40062* (2013.01)

(56) References Cited

U.S. PATENT DOCUMENTS

| | | |
|---|---|---|
| 8,857,208 B2 | 10/2014 | Malin |
| 8,919,637 B2 | 12/2014 | Kim et al. |
| 9,242,810 B2 | 1/2016 | Lossov et al. |
| 9,604,259 B2 | 3/2017 | Lossov et al. |
| 10,114,996 B2 | 10/2018 | Lossov et al. |
| 10,357,804 B2 | 7/2019 | Must et al. |
| 10,621,401 B2 | 4/2020 | Lossov et al. |
| 10,839,448 B2 | 11/2020 | Crebier |
| 2015/0259141 A1 | 9/2015 | Yamada |
| 2015/0302351 A1 | 10/2015 | Cassady et al. |
| 2016/0244260 A1 | 8/2016 | Oshikawa et al. |
| 2017/0313514 A1 | 11/2017 | Lert, Jr. et al. |
| 2018/0094846 A1 | 4/2018 | Koelsch |
| 2020/0005229 A1* | 1/2020 | Durkee ............... G06Q 10/087 |
| 2020/0062502 A1 | 2/2020 | Kütt et al. |
| 2020/0104558 A1 | 4/2020 | Lõssov et al. |

FOREIGN PATENT DOCUMENTS

| | | |
|---|---|---|
| EP | 1614375 A2 | 1/2016 |
| FR | 3001071 A1 | 7/2014 |
| JP | S59172307 A | 9/1984 |
| JP | H0948508 A | 2/1997 |
| JP | 2009535284 A | 10/2009 |
| JP | 2016169062 A | 9/2016 |
| WO | 2012065074 A2 | 5/2012 |
| WO | 2012065074 A3 | 10/2012 |

\* cited by examiner

AUTOMATED OUTDOOR TERMINAL FOR STORAGE AND HANDOVER OF ONLINE ORDERS AND A METHOD TO OPERATE THE TERMINAL

PRIORITY

This application claims priority of U.S. provisional application No. 62/847,813 filed on May 14, 2019 and the content of which is incorporated herein by reference.

FIELD OF INVENTION

This invention relates generally to self-service parcel terminals, and more specifically to automated grocery terminals for online grocery orders and a method to deliver and retrieve grocery orders from the terminal.

BACKGROUND

Various kinds of parcel terminal solutions and processes to control inserting and discharging objects are known from the prior art. Generally, each parcel is stored in a separate locker or shelf.

One such system is disclosed in US 20160244260 which discloses an automatic warehouse including a storage shelf and a carriage device that carries a package. The carriage device includes a horizontal guide member located inside of the storage shelf and extending in a lateral direction, a prop inside of the storage shelf and supporting the horizontal guide member, a cart that travels along the horizontal guide member, a vertical guide member connected to the cart at an intermediate position, and a lift stage guided by the vertical guide member. The automatic warehouse further includes a transfer device attached to the lift stage.

US 20150259141 discloses a transferring apparatus including an elevating platform, a pair of side arms that are placed on the elevating platform and are each capable of stretching toward and retracting from both sides of a package, and a lower conveyor that is placed on the elevating platform. At least either one of the pair of the side arms is movable in a left-and-right direction orthogonal to a stretching-and-retracting direction of the side arm. The side arm that is movable in the left-and-right direction includes a base member that is movable in the left-and-right direction. The base member of the side arm includes a front guide leg-member and a rear guide leg-member that are provided to respective ends in the stretching-and-retracting direction of the base member on the lower side thereof. The lower conveyor is provided below a base body member between the front guide leg-member and the rear guide leg-member.

US 20150302351 discloses a carousel-like system used instead of a conventional parcel system based on a shelf system. Compared to the generally known solutions where each parcel is stored on a shelf in a separate locker or container with a door, the shelves in this system form a conveyor system moving circumferentially and multiple doors located one above the other for inserting and retrieving parcels have been provided at the access point of the storage compartment.

U.S. Pat. No. 8,919,637 discloses a parcel storage dynamically allocating storage space for parcels. In order to ensure highest capacity, a system of shelves is used inside the parcel storage apparatus for storing parcels of variable size.

It is clear however, that the consumers are today ordering not only consumer products online, but more and more grocery shopping is conducted via the internet. Due to the requirement of different storage temperatures, groceries cannot be handled as bulk, and even one order from a single customer most likely requires storing the items in different temperatures. However, the above-mentioned systems are not meant for groceries.

U.S. Pat. No. 6,467,293 teaches a grocery delivery vehicle. The vehicle is adapted to hold and transport groceries for home delivery. The storage includes multiple compartments maintained at different temperatures to keep items place therein refrigerated, frozen or at ambient temperature. Each of the compartments are accessible from outside.

U.S. Pat. No. 8,857,208 discloses a climatic cabinet and storage cabinet that includes an upper zone, a lower zone, storage positions for storing objects in one or the upper and the lower zone, and at least one temperature control unit structures and arrange to maintain a temperature in the one of the upper and lower zone different from the other of upper and lower zone. The cabinet includes a lock, a horizontal transport mechanism arranged at least in part in the other of the upper and lower zone to move the objects to and from the lock in a direction having a horizontal component and a vertical transport mechanism structured and arrange to move the objects between the lower zone and the upper zone.

US 2018/0094846 teaches multi-zone transport refrigerator units (TRUs) with panels for solar power to control temperatures in the units.

EP 1614375 discloses a method of delivering groceries purchased over the internet. The method includes filling up internet orders in a warehouse by filling the ordered groceries in totes, moving the totes into a truck transporting the groceries closer to destination and smaller vehicles then picking up totes from the truck to deliver the totes to customer's homes.

U.S. Pat. No. 7,054,832 discloses a general method and system for selling merchandize. The method includes receiving an order from a customer for a product desired to be picked up by the customer at a given location, readying the product for customer pickup at the given location after receiving the order, detecting the arrival of the customer, and moving the product to a loading station at the given location for customer pickup.

The shortcoming of the currently known solutions is that they are time-consuming because the systems are constructed to do only one activity at a time or that the activities are manual. Moreover, even if containers with different temperature zones are known there has been no system for an automatic loading customer's grocery-orders in different temperature zones, especially in a manner that loading or retrieving multiple items to or from the grocery terminal would be fast and efficient. There are no existing solutions for an automated outdoor terminal specially for requirements of fulfilling grocery orders quickly.

Accordingly, there is a need for an efficient and safe system for storing and handing out grocery orders made remotely, e.g. over the internet.

SUMMARY OF THE INVENTION

Accordingly, it is an objective of this invention to provide an autonomous grocery storage and retrieval terminal comprising: a transportable temperature-controlled container having a top, a bottom, two longitudinal walls, a back end, a front end, and a temperature controlling system; a user console attached to the front end of the container, said user console comprising at least an input device for receiving an input from a user for loading or retrieving one or more grocery orders; the container and the user console together forming an outer shell of the terminal; an inner frame inside the outer shell, the inner frame comprising at least one temperature zone, two longitudinal rows of shelf posts along the longitudinal walls forming shelves, and a longitudinal aisle between the rows, and the shelf posts being configured to hold a multitude totes or receptacles with totes, two inner consoles at the front end of container locating on opposite sides of the aisle, each having an access opening facing toward the aisle, and a lockable inner console door providing an access to the inner console from outside the terminal to receive or load the grocery orders, a mast configured to move along the aisle on a bottom rail, and a loader attached to the mast, the loader being configured to move vertically along the mast and pull out a tote or a tote receptacle fixed to a tote from a shelf and attach on top of the tote or the tote receptacle via guide rails located on a lower side of the loader such the tote is resting underneath the loader, and the mast and the loader being configured to move the tote or the tote receptacle fixed to the tote attached to the loader through the access opening into the inner console that locates on same side of the aisle as the shelf from which the tote was pulled out, the loader further being configured to pull out a tote or tote receptacle fixed to a tote from either of the inner consoles through an access opening and move the tote or the receptacle fixed to the tote to a shelf on same side of the aisle as the inner console from which the tote was pulled out; and the terminal further comprising a controller, and a server in communication with a database for tracking at least one grocery tote within the terminal, and the controller being in communication with the server and the server updating the database regarding location of totes in the terminal.

Another object of the invention is to provide an arrangement for moving grocery totes within a grocery storage and retrieval terminal, said arrangement comprising a horizontally moving mast, and a vertically moving loader attached thereto, wherein the loader comprises a rectangular main structure having two open ends, and two closed sides, each of the closed sides having a guide rail on their lowermost part and distance between the guide rails being such that a grocery tote fixed in a tote frame can be supported by the rails; a magnetic head having two electromagnets, each of the electromagnets facing toward one open end of the main structure, the magnetic head hanging on a linear rail located underneath the main structure in between and parallel to the guide rails, and being configured to move along the linear rail between the open ends, the magnetic head being configured to attach to a tote frame, and upon moving along the linear rail pulling a grocery tote fixed into the tote frame through one open end of the loader along the guide rails to underneath the main structure or pushing the grocery tote fixed to the tote frame out from one open end of the loader along the guiderails to a selected location; and wherein the loader is configured to move vertically along the mast to a height such that one open end is adjacent to the selected location for the magnetic head to push the grocery tote to the location or to pull a grocery tote from the location to the loader along the guiderails.

It is another object of this invention to provide a computerized system to store and retrieve grocery orders in and from a grocery storage and retrieval terminal having a multitude of temperature zones, wherein the system comprises at least a row of parallel shelf posts forming shelves, said posts being arranged such that a multitude of grocery totes or tote receptacles fixed to grocery totes can be supported between the posts, and the at least one shelf post row extends through the multitude of temperature zones, and wherein the system comprises a user interface and computer controls for controlling a horizontally moving mast having a vertically moving loader attached thereto to retrieve or insert grocery totes from or to a shelf in a predetermined temperature zone.

Yet another object of the invention is to provide a computer-controlled method to retrieve or insert multiple grocery orders from or to a grocery storage and retrieval terminal comprising the terminal with an input device and computer implemented controls; the terminal comprising two shelf post rows configured to hold a multitude of grocery totes preferably fixed in tote receptacles, a longitudinal aisle in between the rows, a vertically moving loader attached on a mast configured to move along the aisle, wherein movement of the loader and movement of the mast can be parallel (simultaneous), and two inner consoles locating inside the terminal at same end of the terminal on opposite sides of the aisle for retrieving and loading grocery orders, said method comprising the steps of:

a) selecting a retrieval (also called customer mode) or a loading mode (also called courier mode) based on identification information entered by a user at the input device;

b) upon entering the retrieval mode, initiating movement of the mast along the aisle to a location at the shelf post rows where a tote containing a first order locates, or upon entering loading mode initiating movement of the mast along the aisle to a location at the shelf post rows where an empty tote is located;

c) initiating vertical movement of the loader to a level of the tote containing the first order or to the empty tote and initiating the loader to pull out the tote and initiating the loader to attach to the receptacle fixed to the tote or directly to the tote such that tote is attached underneath the loader;

d) initiating the mast with the tote attached underneath the loader to move along the aisle to the first of the two inner consoles located on the same side of the terminal as the shelf from which the tote was retrieved;

e) initiating the loader to push the tote or the tote with the receptacle into the first of the two inner consoles through an access opening;

f) causing the first inner console door to unlock for the user to open the door and retrieve the first order from the tote located in the first inner console, or the user to load the items of a first order into the empty tote in the first inner console;

g) locking the first inner console upon receiving information that the user closed the door of the first inner console and receiving confirmation from the user input device that retrieval of items at the first inner console is finalized or that loading of items at the first inner console is finalized;

h) simultaneously with step f)) identifying a second tote with a second order or a second empty tote locating on the opposite shelf post row than the tote with the first order or the first empty tote, and initiating the mast to move along the aisle to the location where a tote containing the second order or the second empty tote is located;

i) initiating vertical movement of the loader to a level of the tote containing the second order or the second empty tote and initiating the loader to attach to the receptacle fixed to the tote or directly to the tote such that tote is attached underneath the loader;

j) initiating movement of the mast with the tote attached underneath the loader along the aisle to the second of the two inner consoles on the same side of the aisle as the shelf from which the second tote was retrieved;

k) initiating the loader to push the tote or the receptacle with the tote into the second inner console;

l) initiating the second inner console door to unlock after which the user can open the door and retrieve the second order from the second inner console, or the user can load the items of a second order to the empty tote at the second inner console;

m) locking the second inner console upon receiving information that the user closed the door of the second inner console and receiving confirmation from the user input device that retrieval of items at the second inner console is finalized or that loading of items at the first inner console is finalized;

n) simultaneously with step l)) initiating the mast and the loader to remove the full tote or the empty tote from the first inner console and transport to an empty shelf locating on the same side of the aisle as the first inner console for storage;

o) repeating steps b-g) for a third order;

p) repeating steps h-m) for a fourth order;

q) repeating steps b-n) until each of the grocery orders are picked up or each of the grocery orders are filled in.

SHORT DESCRIPTION OF THE DRAWINGS

FIG. 1 shows a perspective view of the grocery terminal 1. The figure shows the outer shell 10, the user console 600 at a front end of the terminal with an inner console door 506 open.

Figure 2:
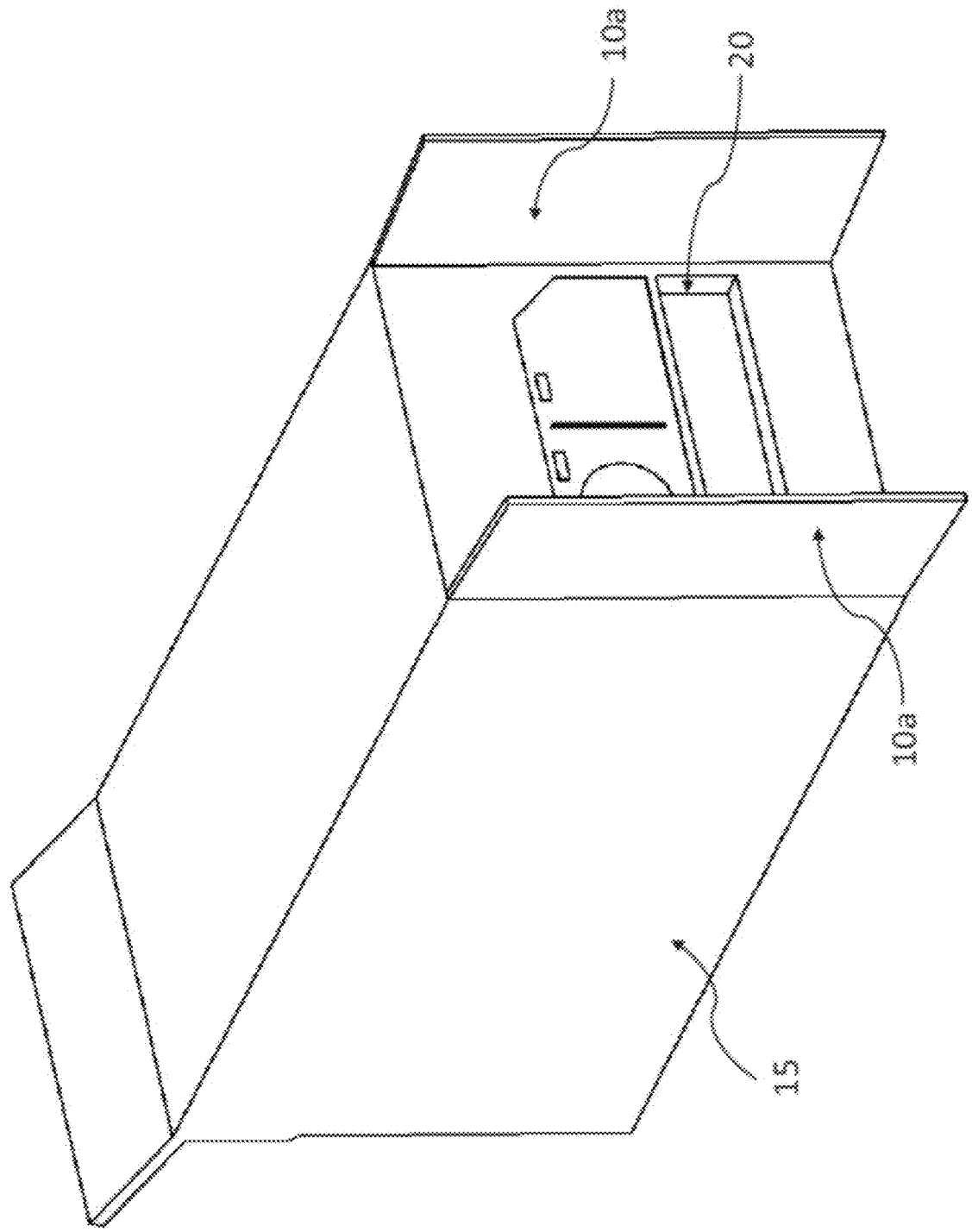

FIG. 2 shows another perspective view of the grocery terminal 1. The figure shows the back end of the terminal with doors 10a to enter the temperature controlling or refrigeration unit 20.

Figure 3:
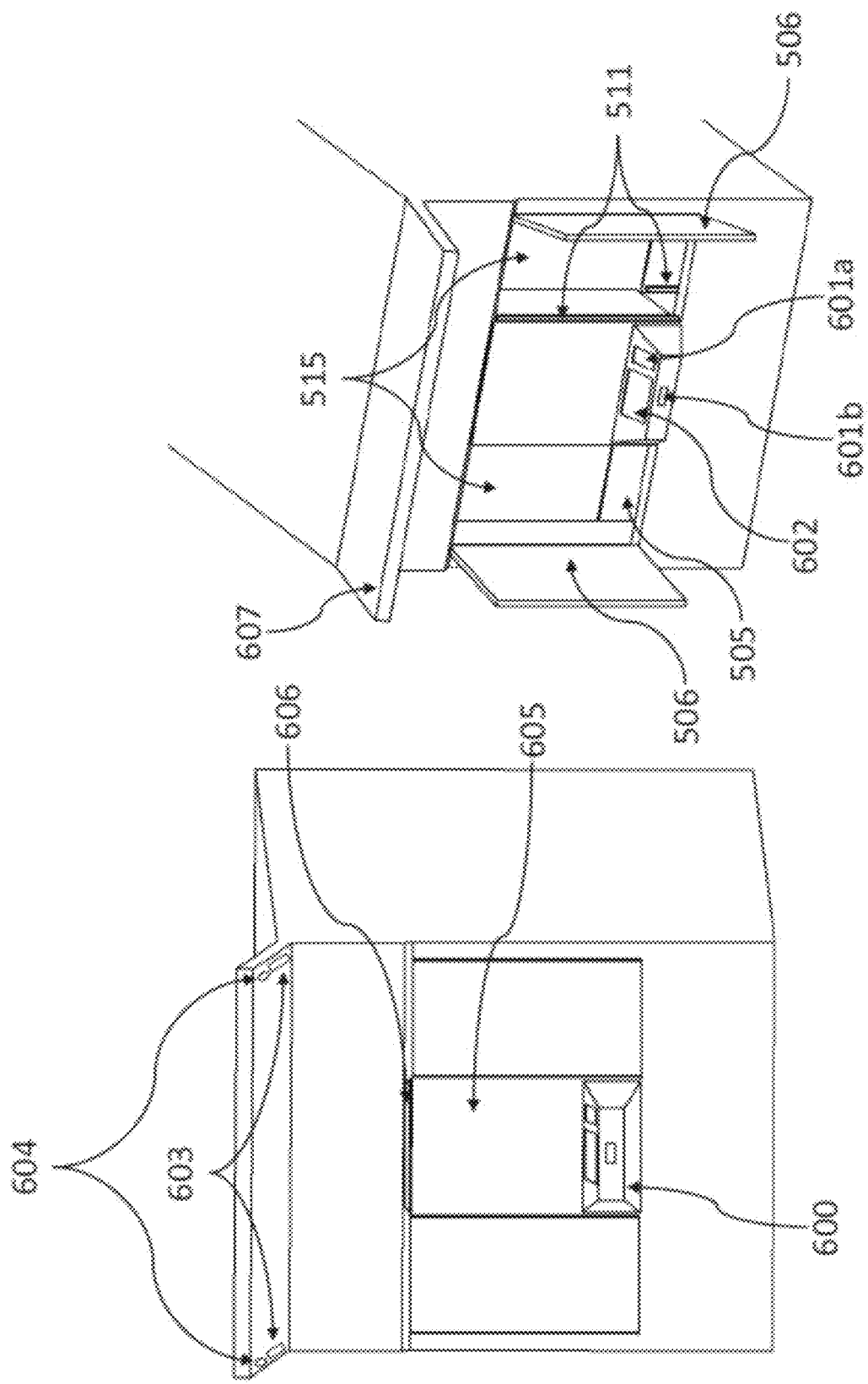

FIGS. 3A and 3B show a view to the user console. In FIG. 3B the inner console doors 506 are open while in FIG. 3A the doors are closed. The figures show user console 600, end-user scanners 601a and 601b, touch screen assembly 602, console dome cameras 603, LED lights 604, viewing window 605, instrument unit 606 that houses a cover plate which hides motion sensors and conference call system, console roof 607, advertisement space 515, inner console 505, inner console doors 506. In FIG. 3B also two sets of safety light curtains 511 are shown.

Figure 4:
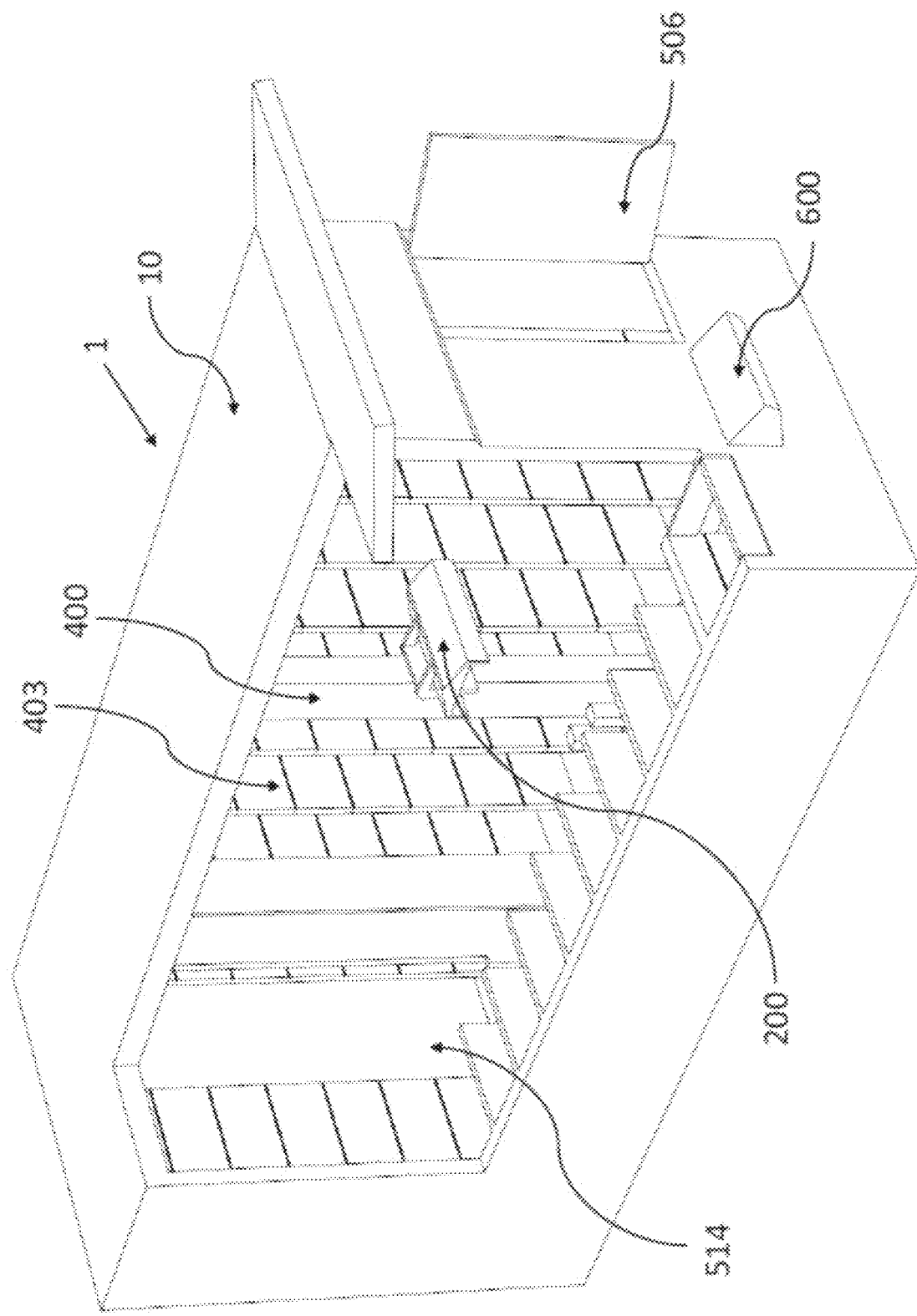

FIG. 4 is a partially opened view of the terminal 1. The figure shows the outer shell 10 having the user console 600 with inner console door 506 in open position. Inside the terminal an inner frame 514 comprises a multitude of shelf posts 403 against both of the longitudinal walls of the terminal. A mast 400 and a loader 200 are shown.

Figure 5:
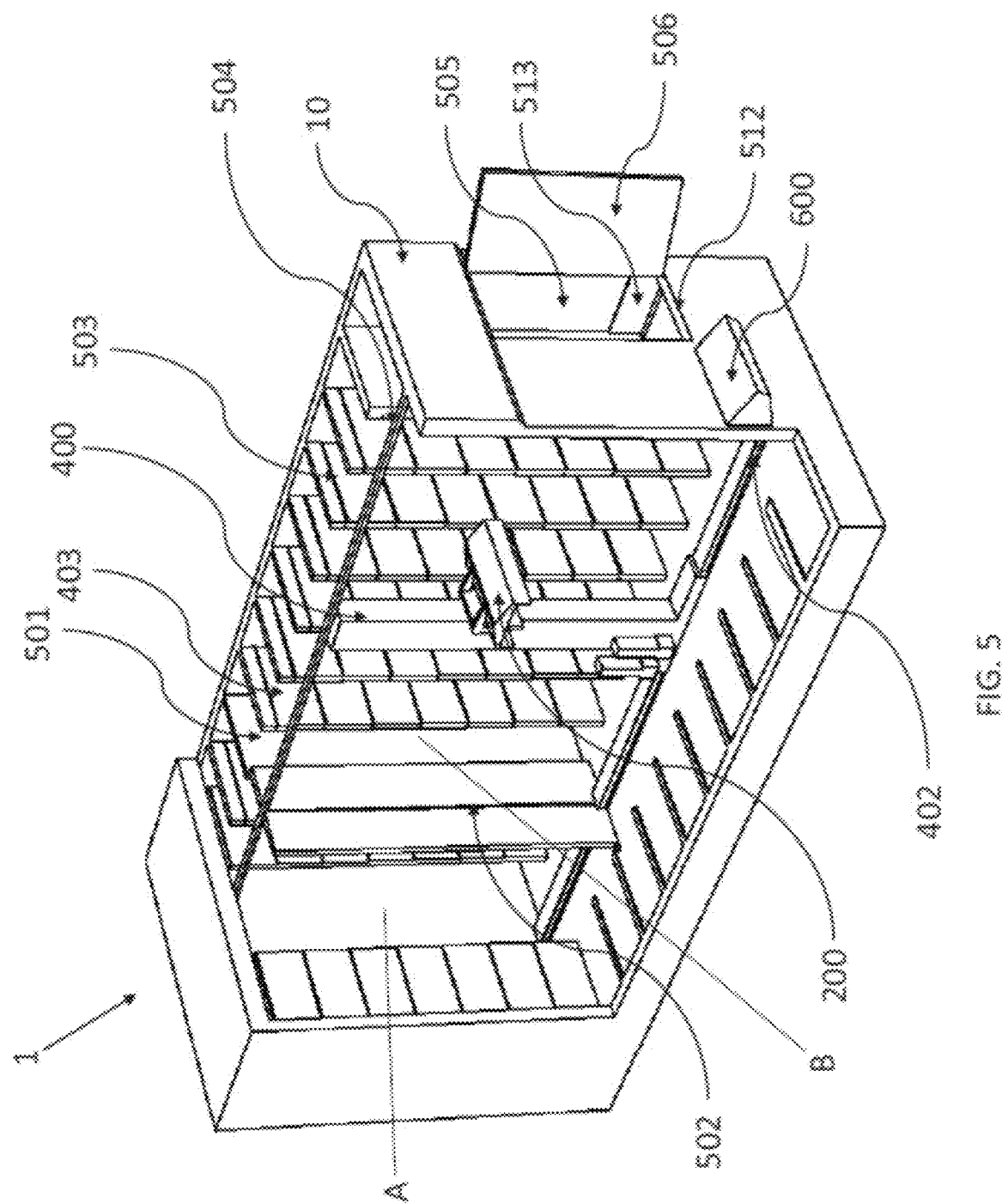

FIG. 5 is another illustration of a partial opened view of the terminal 1. The figure shows the outer shell 10, the shelf posts 403, support rails 503, the mast 400, the loader 200, the top rail 504, and bottom rail 402, and the inner console 505 with bottom parts 513 of the side walls of the inner console, and the counter 512. Notably, on the opposite side of the aisle the structure is identical, i.e. there is a second inner console on the other side of the aisle. The terminal is divided into two different temperature zones, A and B, separated from each other by insulated wall 501 and sliding door 502.

Figure 6:
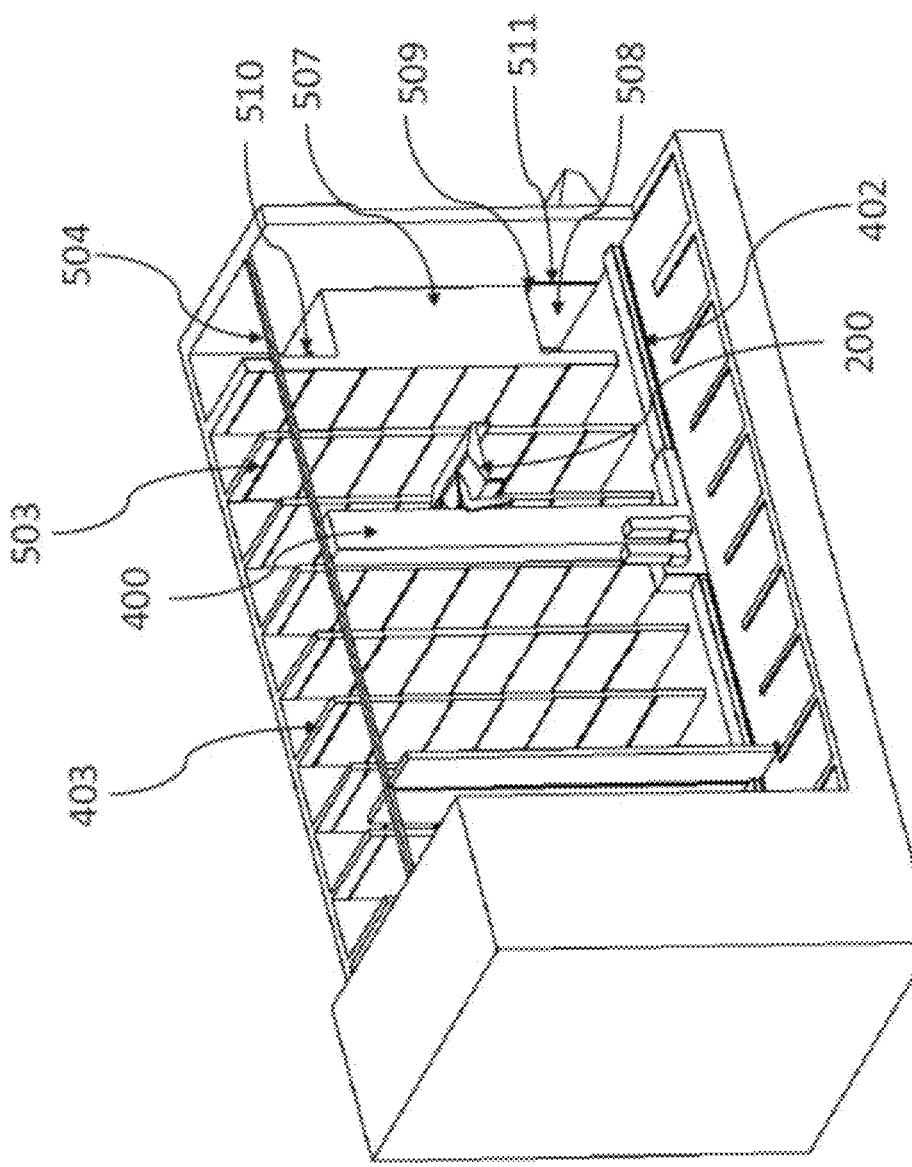

FIG. 6 shows yet another partial opened view of the terminal. Shown are the shelf posts 403, support rails 503, the top rail 504 and bottom rail 402, the mast 400, and the loader 200. Furthermore, the figure shows the insulated chamber 507 of an inner console, the bottom part 508 of the inner console (includes an access opening), the guide rails 509 for a tote frame, and safety light curtains 511 at the bottom part of the inner console. Again there is an identical second inner console on the opposite side of the aisle having same elements.

Figure 7:
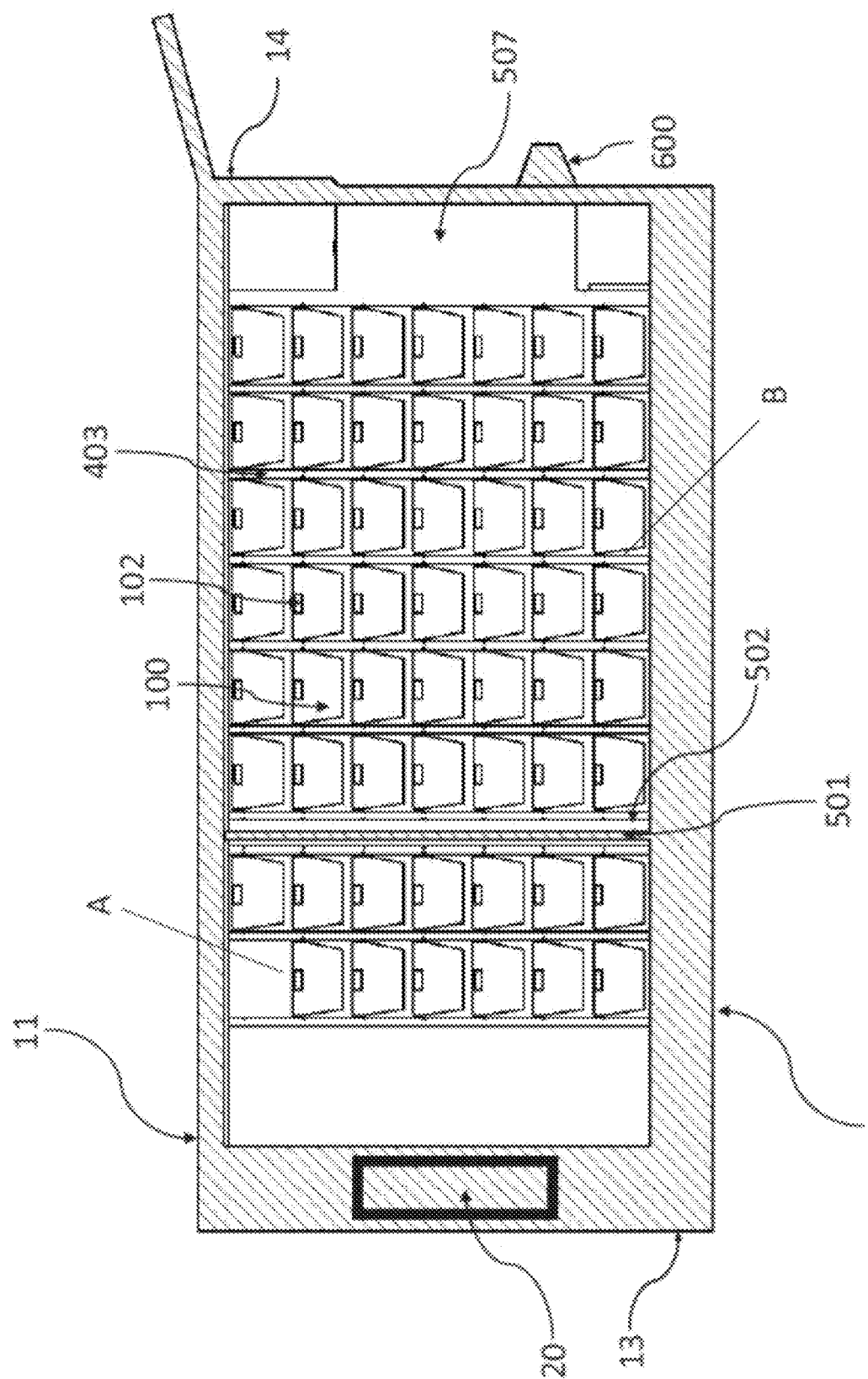

FIG. 7 shows a longitudinal cross section of the grocery terminal. At the back end of the terminal is a refrigerator unit 20. Closest to the refrigerator unit is a low temperature zone A separated from the warmer zone B by an insulated wall 501 and a sliding door 502. Both zones have shelf posts 403 and totes 100. Steel plates 102 of the tote frames are visible here. The figure also shows the user console 600 and the insulated chamber 507 of an inner console. Top 11, bottom 12, back end 13, and front end 14 of the terminal are shown here also.

Figure 8A:
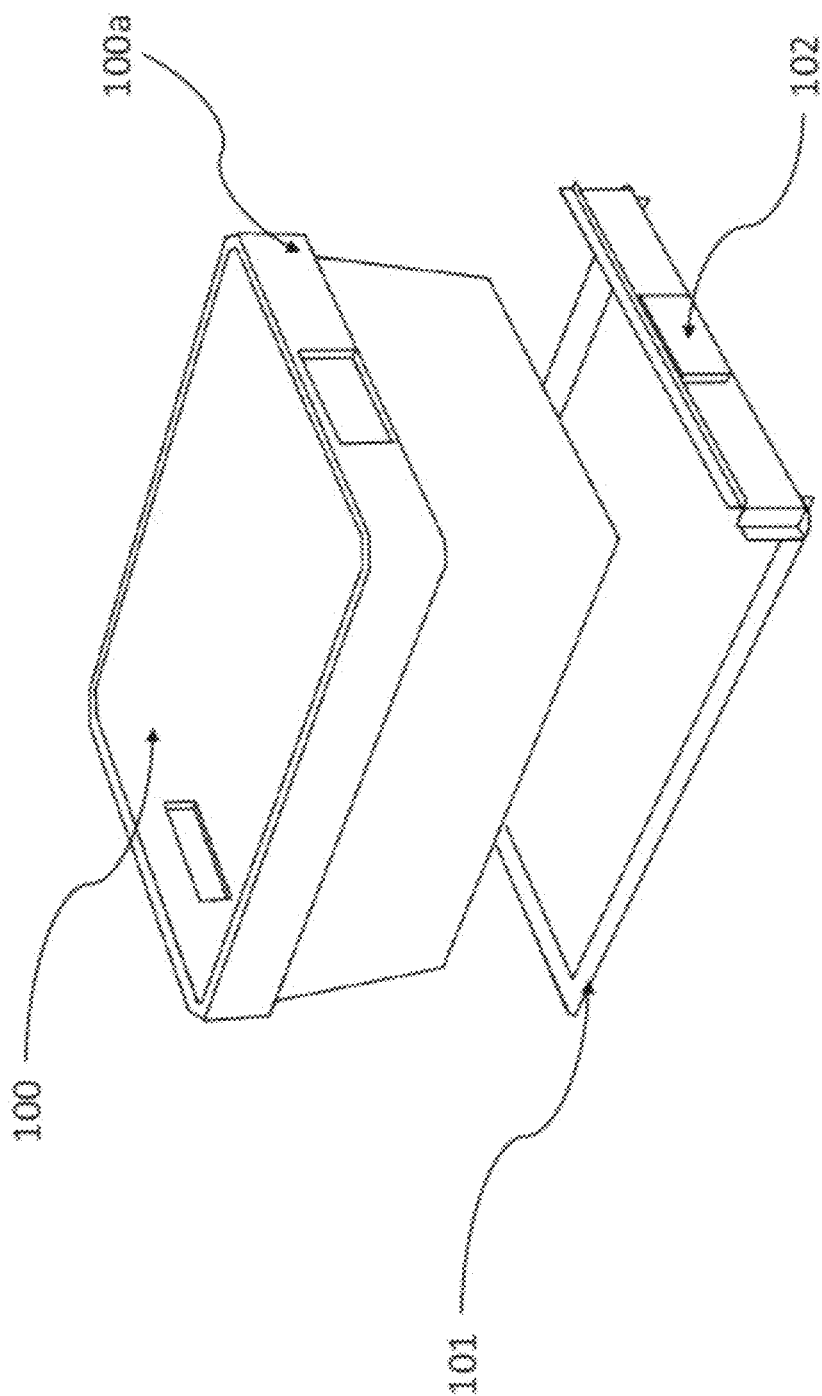

FIG. 8A shows a tote 100 and a tote frame (receptacle) 101. The front side of the tote frame has a steel plate 102. The tote has an upper edge 100a extending around the outer surface of the tote.

Figure 8C:
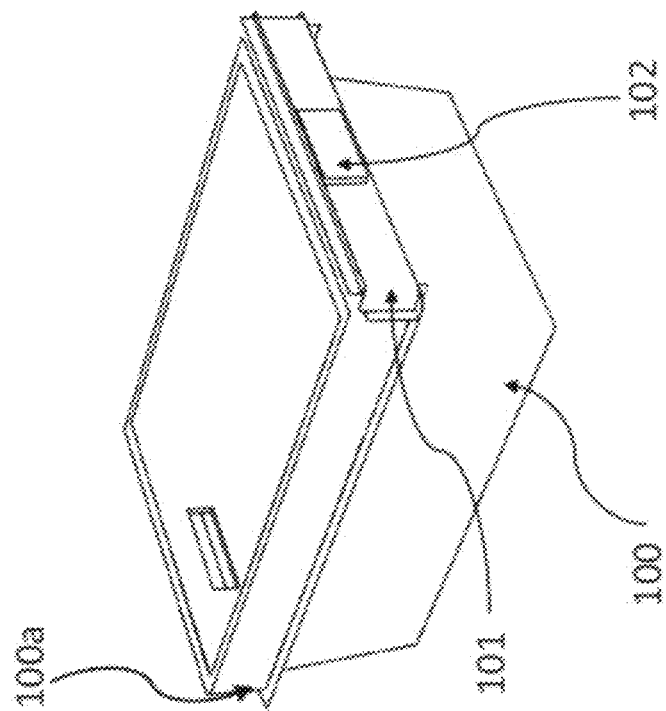
Figure 8B:
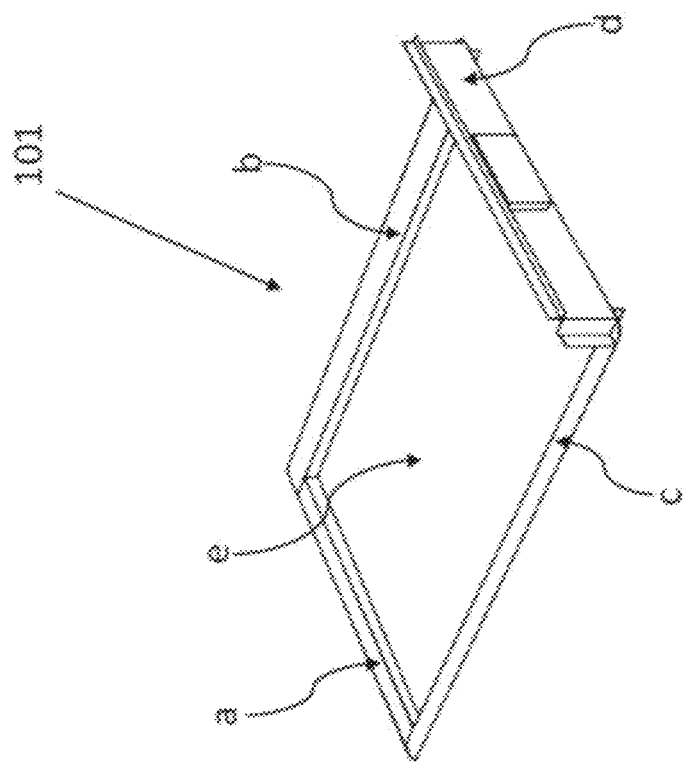

FIG. 8B is an illustration of a dip-in tote frame 101. The frame has four sides (side rails) a, b, c, and d that leave an empty rectangular space e in the middle. The dimensions of the empty space are such that a tote can be dipped through the empty space and the tote will hang from the sides of the frame supported by its upper edge. At least two opposite side rails are broader than the edge such that when the tote rests on the frame the outer parts of the side rails are not covered by the edge (seen in FIG. 8C). These outer parts will be supporting the tote fixed in the frame on the guide rails of the loader.

FIG. 8C shows a tote 100 inserted into the frame 101. The steel plate 102 is also shown. The four sides of the tote frame are snugly attached around the tote such that the tote is supported by the frame from its upper edge 100a.

Figure 8D:
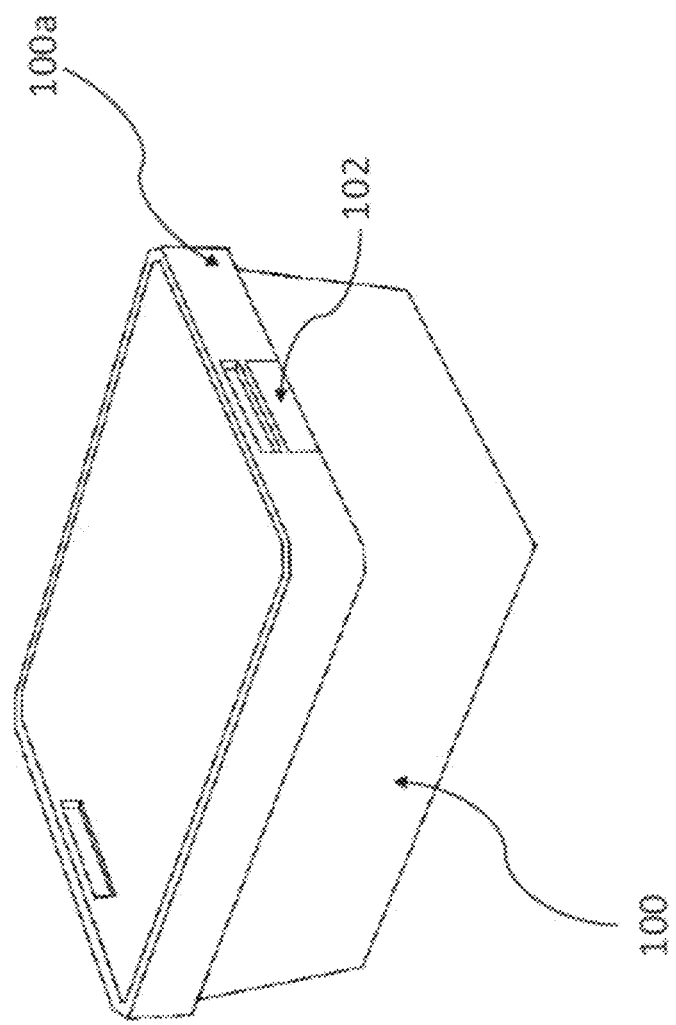

FIG. 8D illustrates a tote 100 that has the steel plate 102 attached directly to the tote. The upper edge 100a is shown.

Figure 8E:
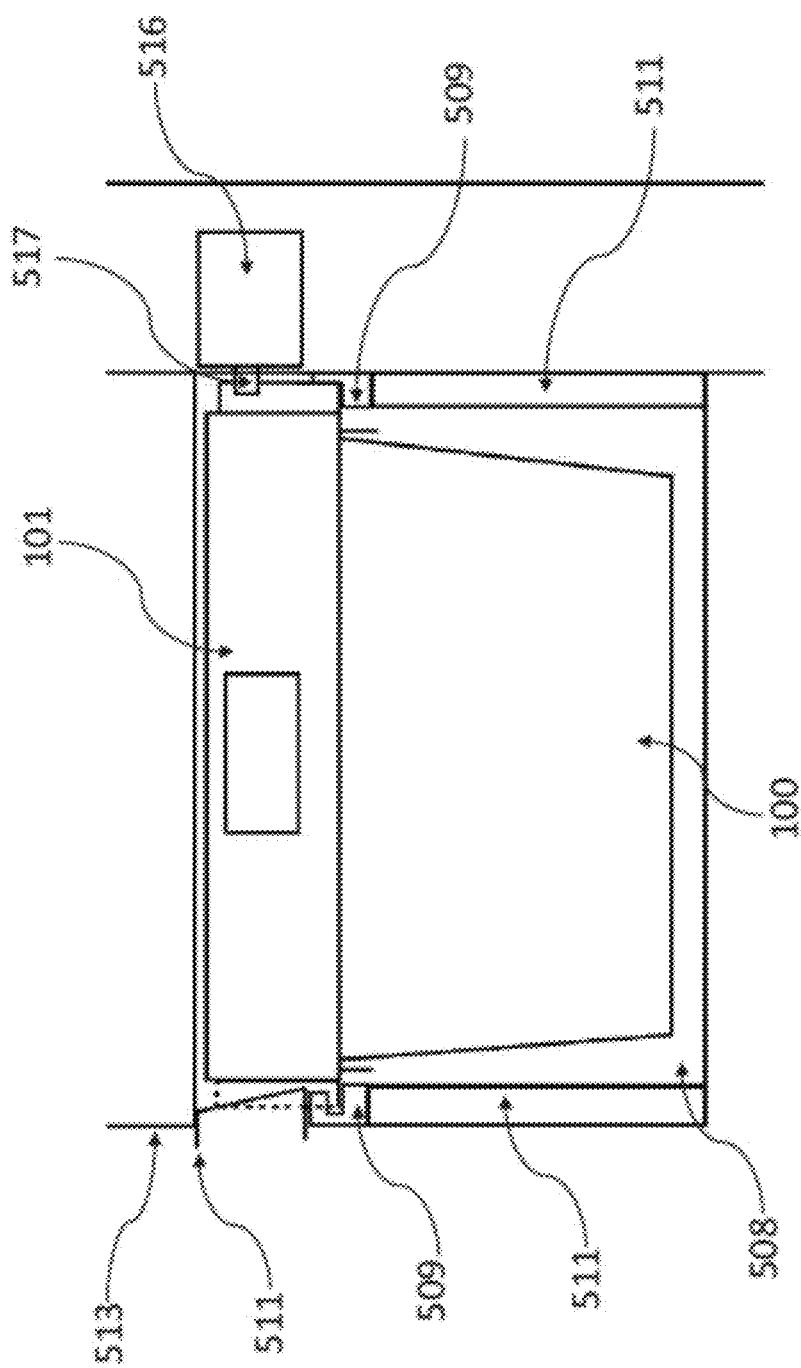

FIG. 8E is a view from inside the inner console toward the tote 100. The tote is resting on the U-shaped guide rails 509 by means of the tote frame slider rails and the tote frame is locked into the inner console with a lock 516 to prevent the frame to be removed from the inner console by a user.

Figure 9:
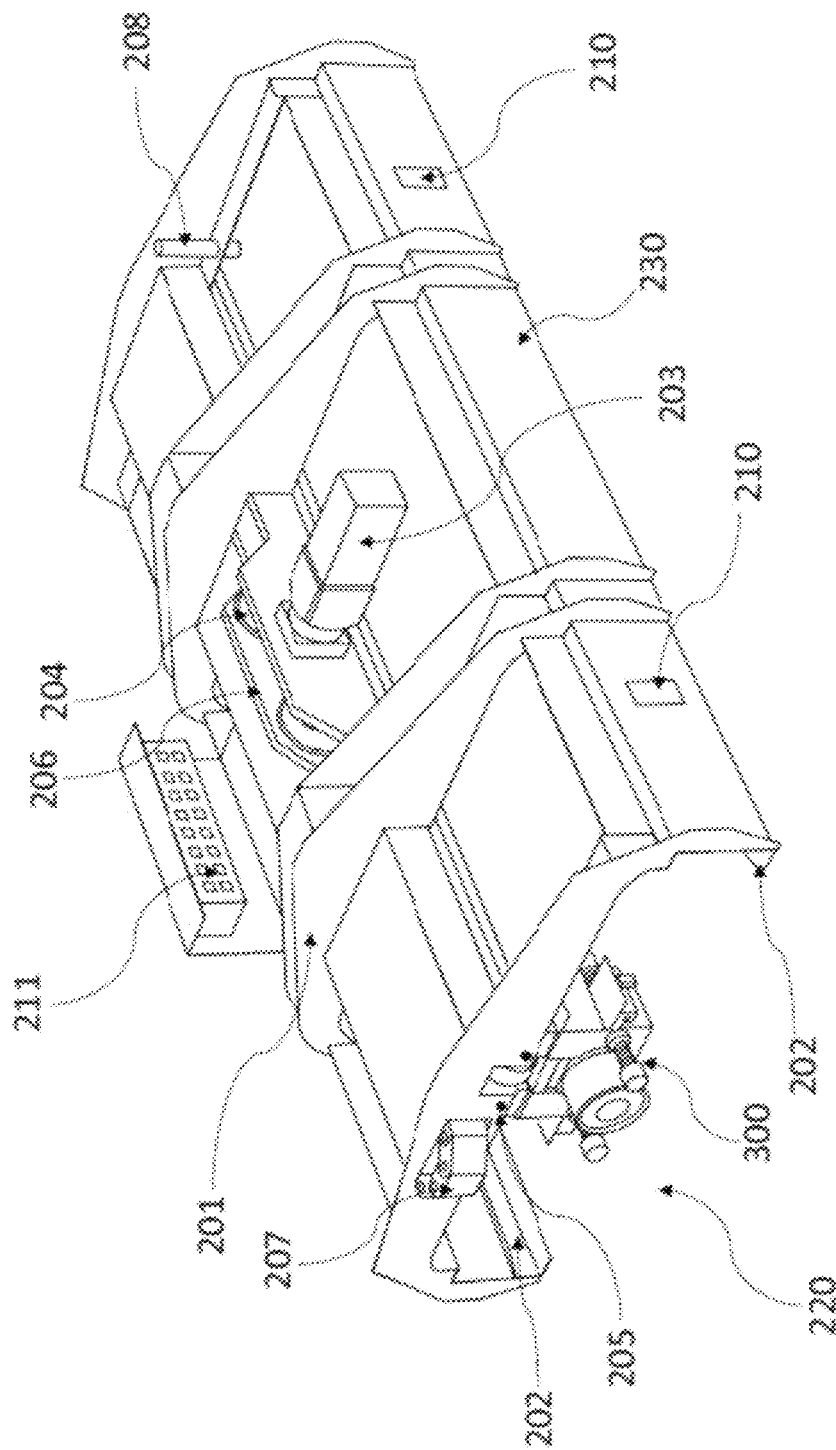

FIG. 9 shows the construction of the main structure 201 of the loader 200. The loader has two open ends 220 and two closed sides 230. The figure shows the guide rails 202, the electric motor 203, the position sensors 210, the home sensor 208, the drive belt 204, and the magnetic head 300. Also shown are adjustment screws 205, two plates 206 in between of which the drive belt is placed, home sensor 208, and junction box 201 collecting all sensor signals generated on the loader.

Figure 10:
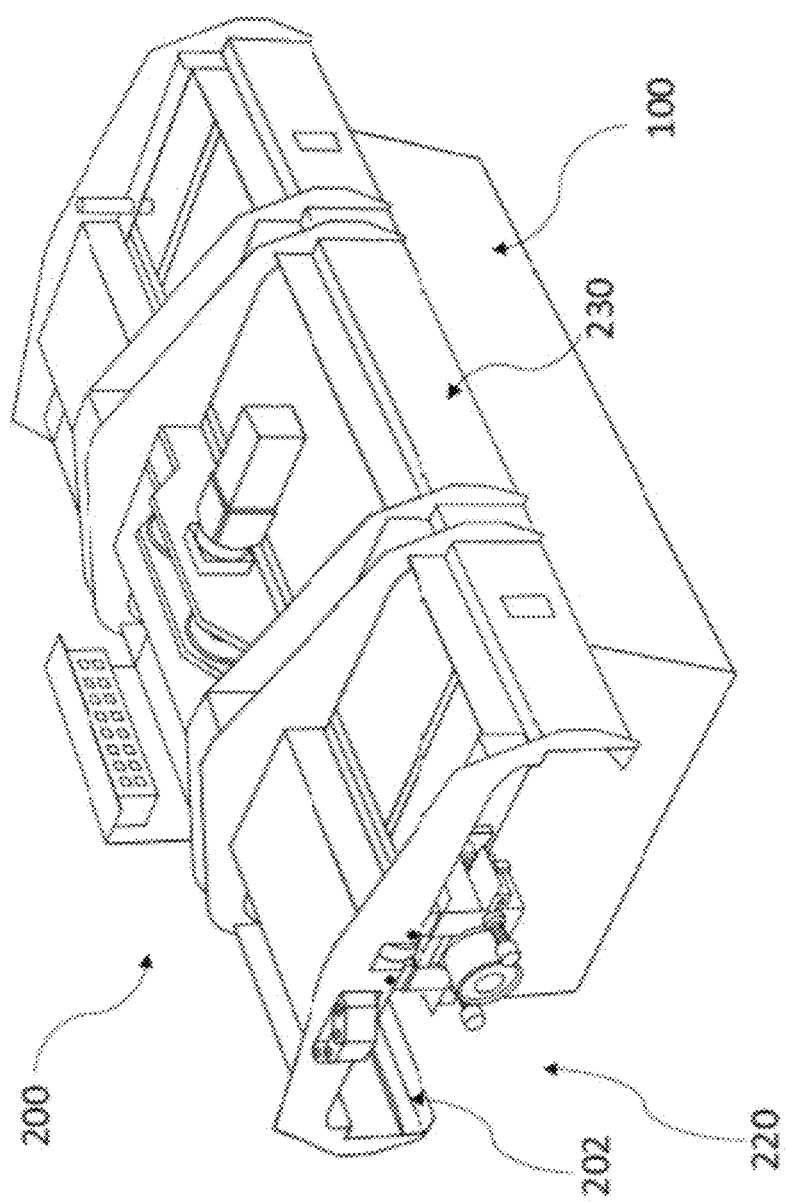

FIG. 10 is an illustration where a tote 100 is inserted underneath the loader 200. The tote frame (not visible) is supporting the tote by resting on the guide rails 202 of the loader that locate on the lowermost parts of the closed sides 230.

Figure 11:
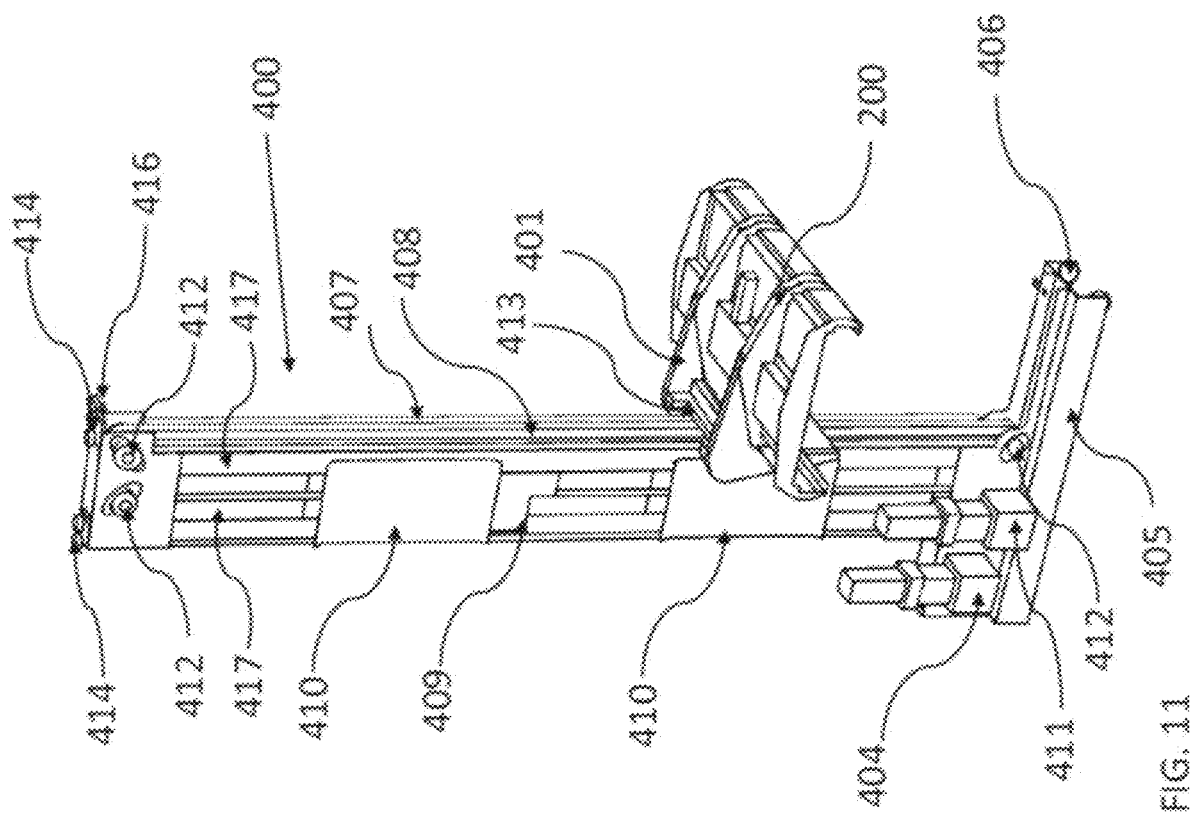

FIG. 11 shows the structure of the mast 400 with the loader 200. The figure shows the carriage 405, linear guide rails 407, lift belt drive 408, counterweight 409, lift drive motor 411, upper support rollers 414, loader carriage plate 413, hanging brackets 401, and the loader 200. Also shown are drive rollers 406 connecting mast to rail, lift belt drive 408, metal plates 410 to support structures for mast and to give rigidity to the structure, adjustable idlers 412, homing sensor 415, and camera 416 for recording and video streaming loader operations.

Figure 12B:
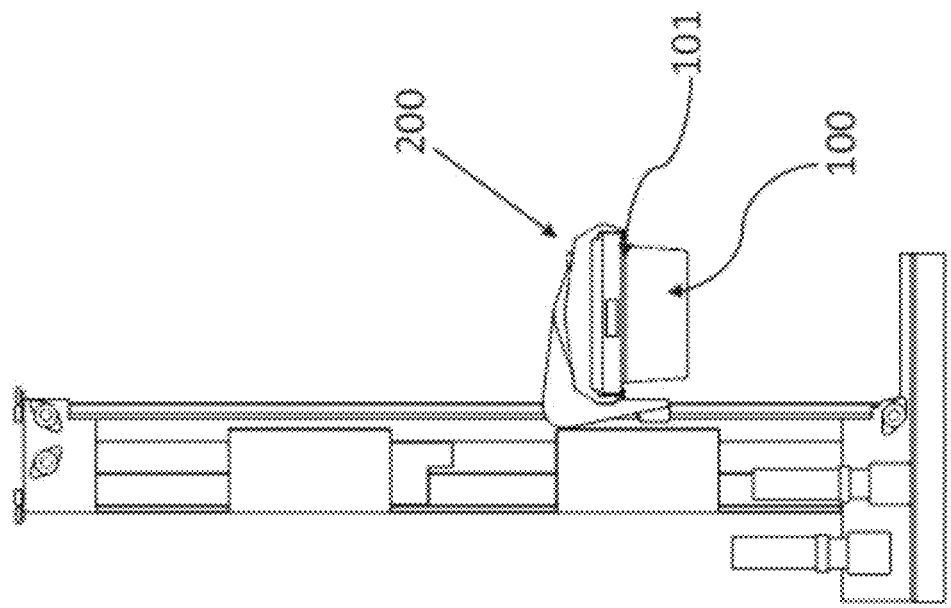
Figure 12A:
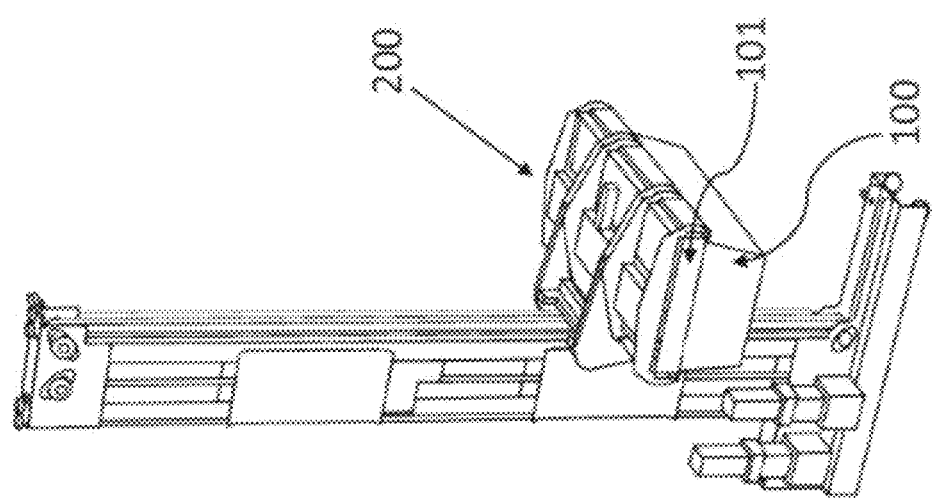

FIGS. 12A and 12B are further illustrations showing the loader 200 holding the tote 100 in a tote frame 101.

Figure 13:
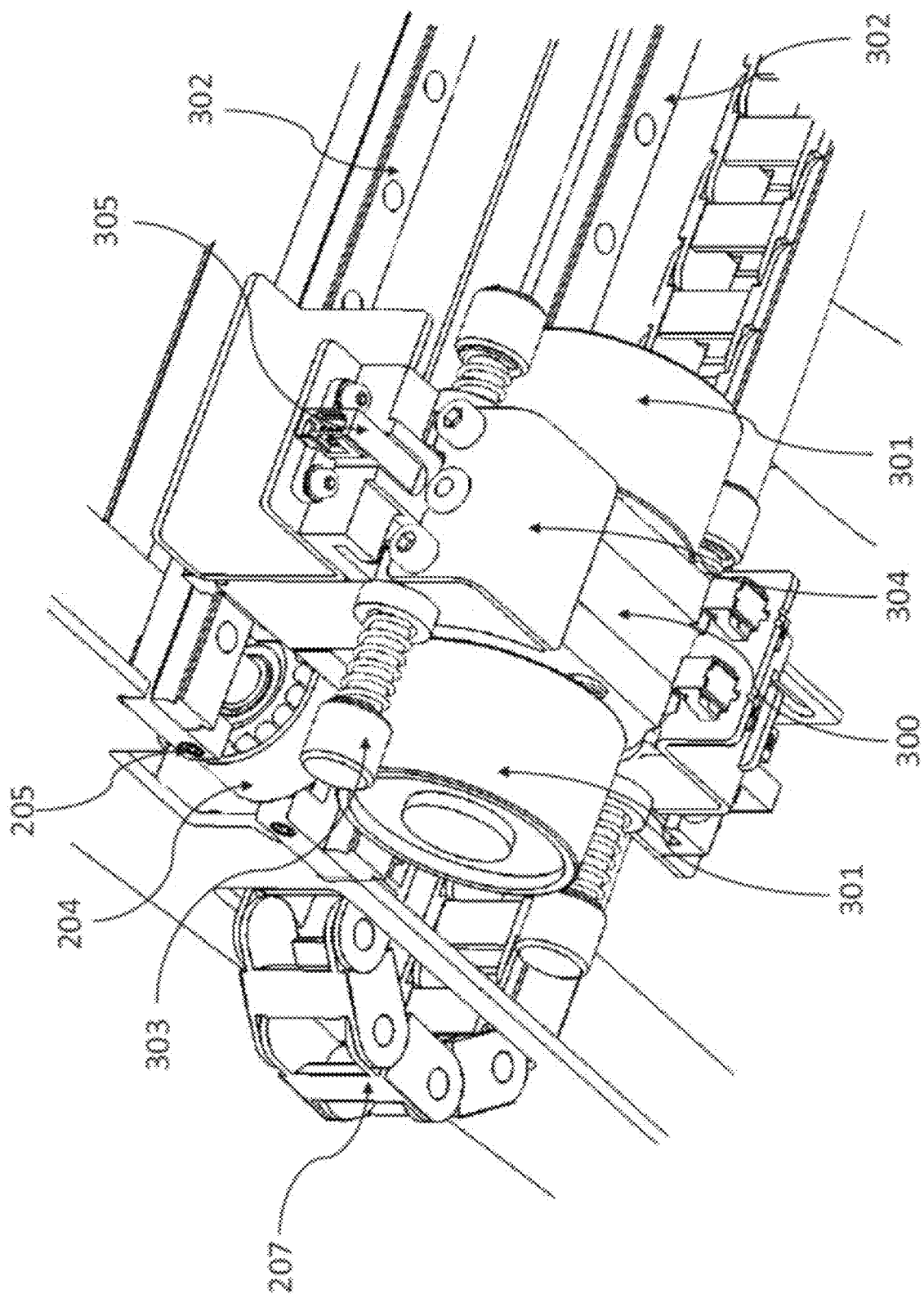

FIG. 13 is a detailed drawing of the magnetic head 300, comprising two electromagnets 301, a housing 304, pushers 303 and linear guiderails 302 from which the magnetic head is hanging.

Figure 14A:
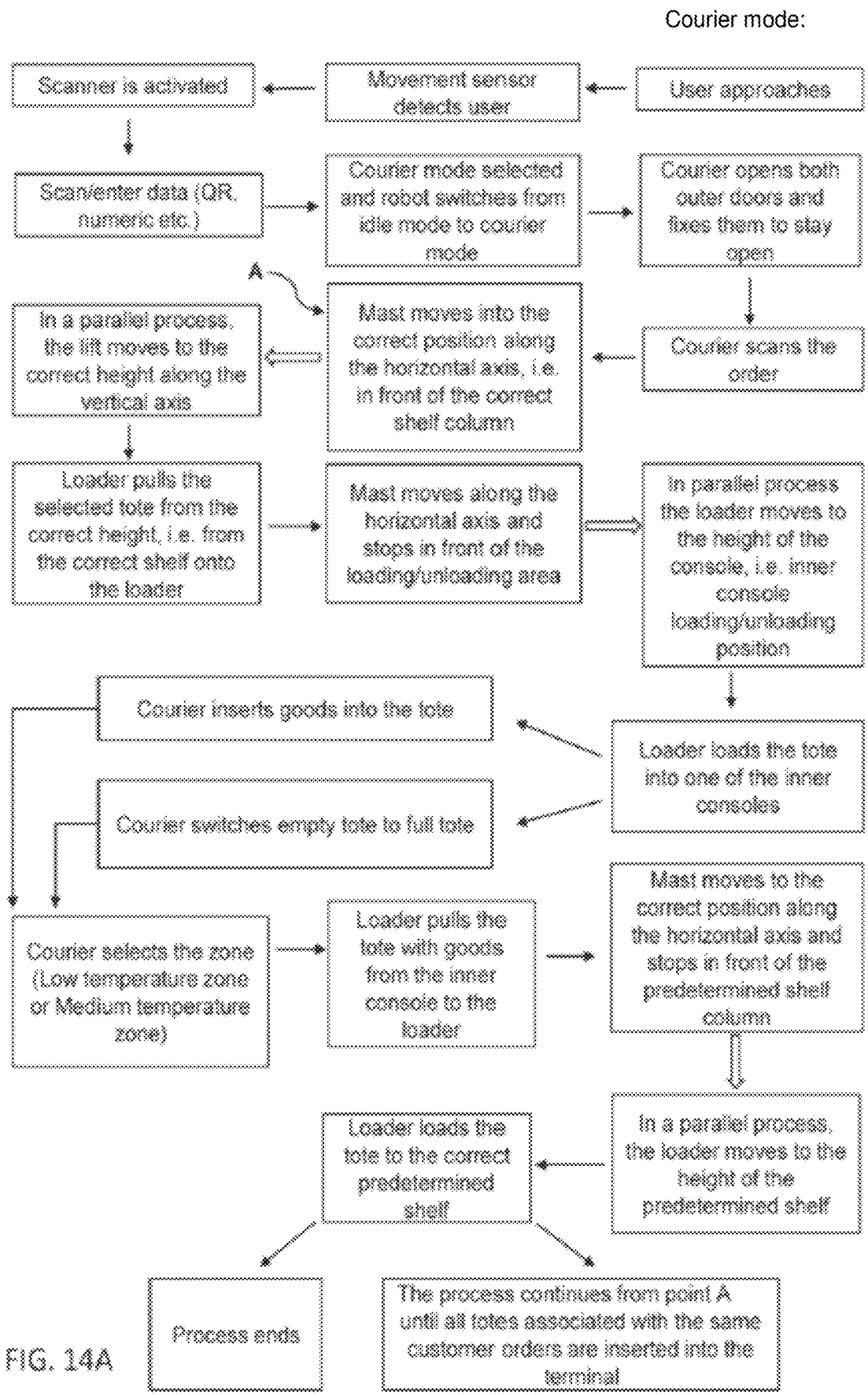
Figure 14B:
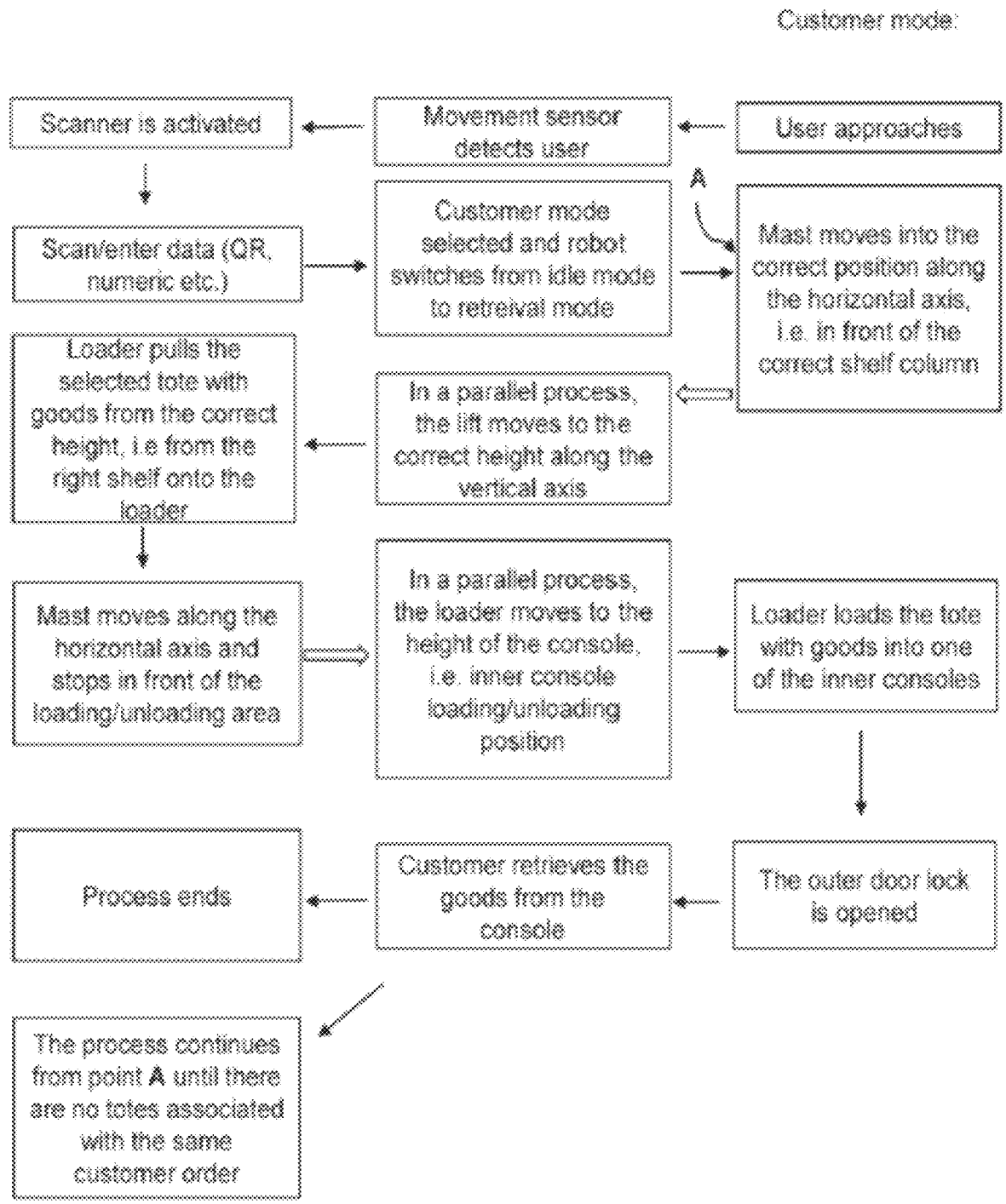
Figure 14C:
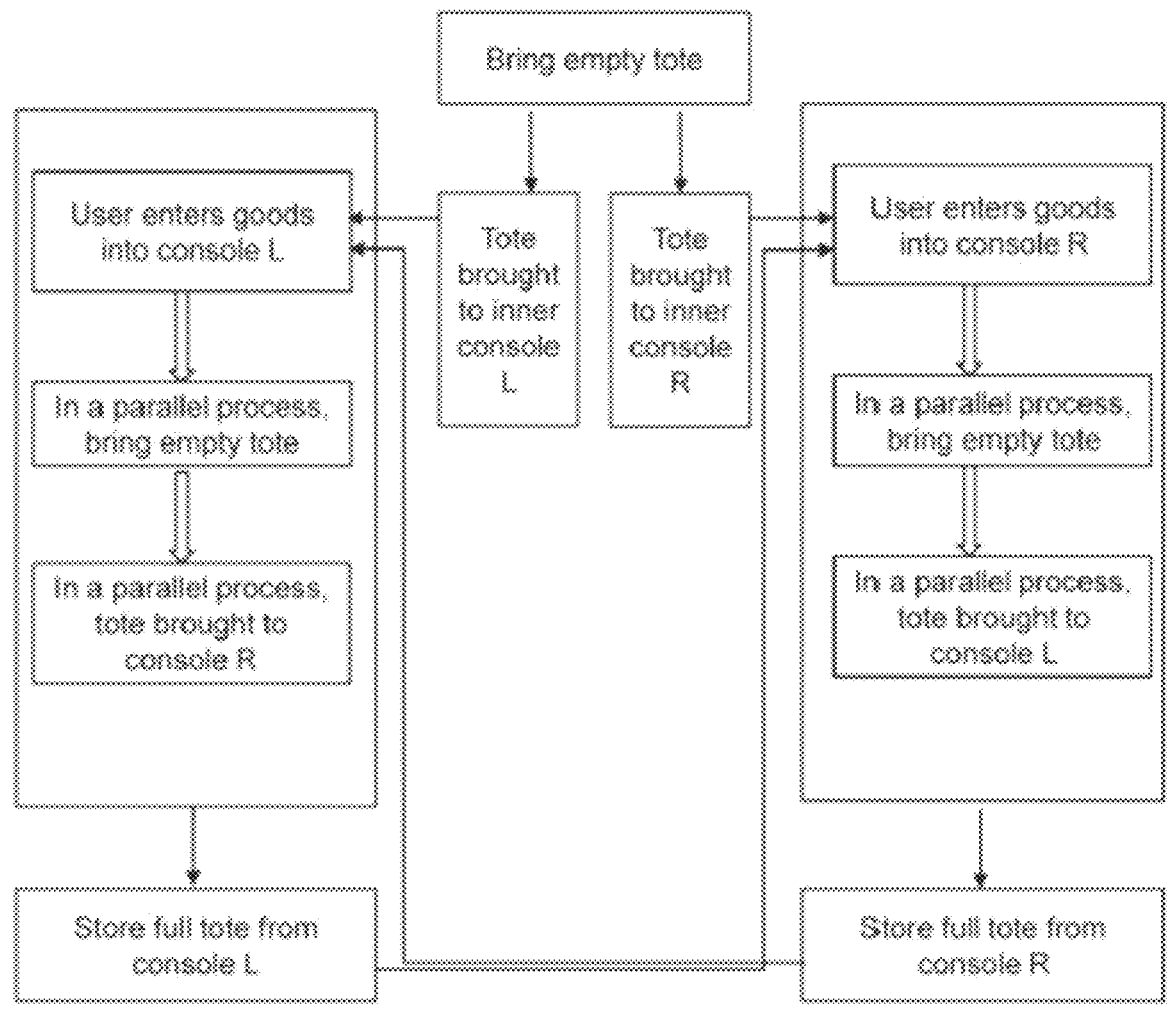
Figure 14D:
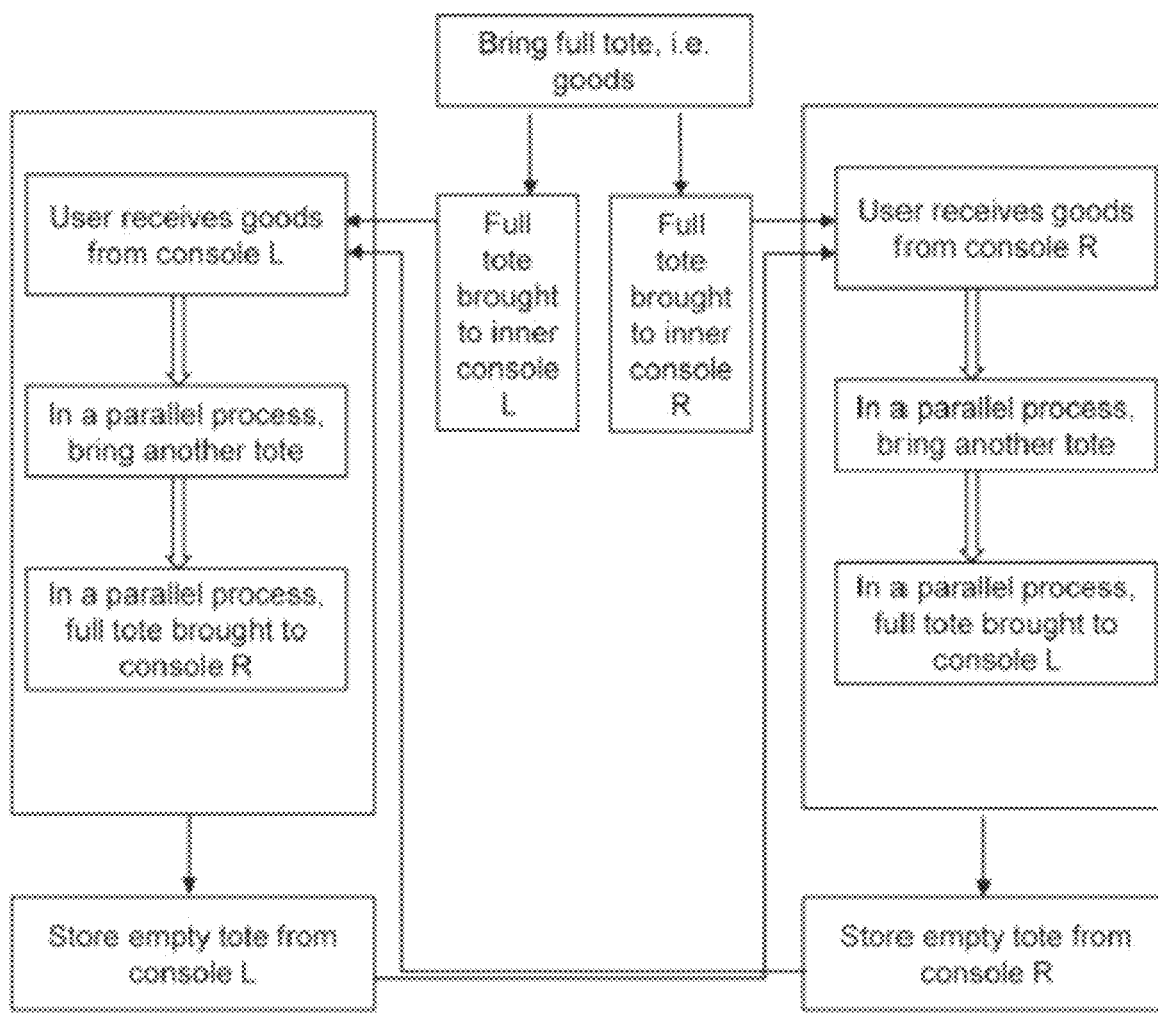

FIGS. 14A, 14B, 14C and 14D show flow charts illustrating the computer-controlled method of loading and unloading grocery orders to and from the terminal. More specifically FIG. 14A shows operation when the system is on courier mode (loading mode); FIG. 14B shows operation when the system is on customer mode (retrieval mode) FIG. 14C illustrates the parallel operations during insertion process (loading mode) of multiple totes and FIG. 14D illustrates the parallel operations during receiving process (receiving mode) of multiple totes. In FIGS. 14C and D the two inner consoles are marked as L (left) and R (right) console—these equal with terms first and second consoles elsewhere in the text.

Figure 15:
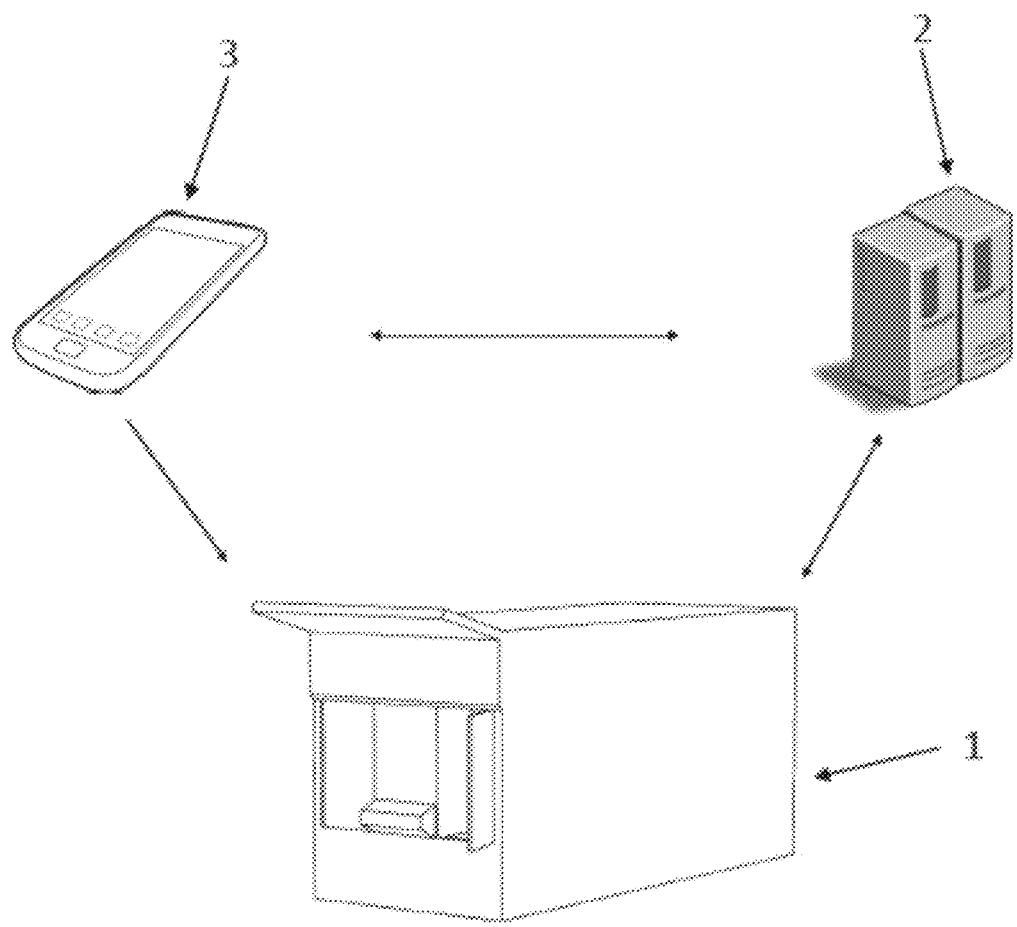

FIG. 15 is a schematic illustration showing the communications between the user via a communication device, the terminal via the user console and the server.

DETAILED DESCRIPTION OF THE INVENTION

The parcel terminal according to this invention is built inside a temperature controlled transportable container, and the terminal comprises of outer shell 10 which includes a user console 600, at least one and preferably two inner consoles 505, a mast 400, a loader 200, an inner frame 514 comprising multiple shelf posts 403 for storing grocery items of different sizes in standardized grocery totes 100 inside specifically designed tote frames 101. The terminal has multiple temperature zones.

The terminal according to this invention is preferably meant for storing and delivering grocery orders and accordingly the temperature control preferably is a cooling system comprising a refrigerating unit 20.

According to a preferred embodiment the transportable container is a shipping container.

The grocery terminal 1 may be connected to a server 2 in order to process data, generate user and parcel codes and for identifying users with the web application or smart device application 3, as well as sending data to the parcel terminal. The terminal may include computing hardware for carrying out the above-noted functionalities of FIGS. 14A-14D and other functions, processes, steps, etc. of this disclosure. In an embodiment, the grocery terminal may include a first computing device, such as a general purpose computer having a computer-readable memory with instructions and a processor executing those instructions, that provides the user interface, effects communications with the server, and initiates commands to move the mast and/or the loader, and other mechanical components of the terminal. The terminal may further include a second computing device that controls movement of the loader and other mechanical components. The second computing device may receive movement commands from the first processing device and transmit movement instructions to the mechanical components. In one embodiment the second computing device may be a programmable logic controller (PLC). The second computing device may also control locking and unlocking of the inner console door, in an embodiment, responsive to input from the motion sensor, scanner, and/or first computing device. It should be noted that, although specific computing hardware is noted above for the first and second computing devices, any type of appropriate computing hardware may be used for any computing device in the parcel terminal, including but not limited to a general-purpose computer, a PLC, another programmable logic device (PLD), an application-specific integrated circuit (ASIC), etc. Further, it should be noted that functions, processes, steps, etc. of this disclosure that are carried out by such computing devices may be embodied in any combination of software, digital hardware, and analog hardware. Still further, although two computing devices are explicitly described above, it should be appreciated that the functions, processes, steps, etc. of this disclosure may be carried out by a single computing device, by two computing devices, or by more than two computing devices of the parcel terminal.

The invention is now described in light of the appended drawings.

According to a preferred embodiment and referring specifically to FIGS. 1 and 2, the terminal according to this invention is constructed inside a refrigerated transportable container, which according to a preferred embodiment is a shipping container. The container has a bottom and top, two longitudinal walls, one shorter back end wall and an opposite short front end. In a case when the container is a shipping container, the wall of the front end of the original shipping container has been removed before building the terminal. Alternatively, only the original doors of the shipping container may have been removed. The container has cooling, and refrigeration systems as is known in the art. The longitudinal container walls form the side walls of the terminal and the top and the bottom of the container form the floor and ceiling of the terminal, respectively.

User Console:

Referring specifically to FIGS. 3A, B and 4, the grocery terminal has a user console 600. The user console is attached onto the outer shell 10 of the terminal. The attachment according to one preferred embodiment is via hinges such that the user console can be opened when necessary to provide full access into the terminal. Other attachment means are also possible. The user console is installed preferably at a short end of the terminal. The user console serves as an interaction area of the terminal. The user console comprises an input device which according to a preferred embodiment comprises a touch screen, two scanners, an NFC (near field communication) module and an ADA (Americans with Disabilities Act)-compliant headphone jack with a volume control button. The user console further comprises a motion detector, a speaker and a microphone. A customer retrieving his/her online order(s) from the terminal will enter via the user console his/her credentials, which may include, for example, an order number, customer's identity, and items that are picked up this time.

A courier delivering groceries to the terminal is also required to identify him/herself at the user console. Depending whether the person identifying at the user console is customer or a courier, the system will be activated to be on retrieval mode (also called customer mode) or loading mode (also called courier mode). According to one preferred embodiment the system is in idle mode when not activated to be on retrieval or loading mode. According to another embodiment the retrieval mode may be a default mode.

The presence of the user at the console may be recognized by a motion sensor. A scanner will be activated, and the user may be identified by scanning a previously generated unique single-use code, such QR-code, a bar code, a combination of number/letter, etc., with the scanner. The code may be generated with a communications device app, e.g. smart phone app. The code will indicate whether the user is a customer (i.e. retrieval mode) retrieving his/her groceries or a courier (i.e. loading mode) to load in ordered groceries. According to one preferred embodiment the computer-controlled system is on idle mode and will be switched to retrieval mode upon customer identifying him/herself or to courier mode upon a courier identifying him/herself.

According to another preferred embodiment a default mode of the terminal is customer mode (retrieval mode) and upon a courier identifying him/herself the computer-controlled system switches to courier mode (loading mode).

The controller may receive scanned signals from the scanner, and the controller may transmit scanned information to the central server.

Inner Console:

Now referring specifically to FIGS. 5 and 6, the parcel (grocery) terminal has preferably two inner consoles 505. The inner consoles locate at same end of the terminal on opposite sides of the aisle. Both of the inner consoles comprise an insulated chamber 507 inside the terminal. Both of the inner consoles have at least one door 506. The door is preferably of glass or other transparent material. The door provides access to outside the terminal. The door is locked by default while the mast 400 or the loader 200 is moving. According to one embodiment the door(s) may be opened when the terminal is on courier mode (loading mode) even at same time when the mast moves. The doors can be locked in an open position by a courier having access to the terminal. According to one embodiment the console doors are automated via a motorized solution and the handover of the delivery thus can be contactless. Automated closing and opening may for example be controlled via a smart phone. Both of the inner consoles have a bottom part 508 with an access opening accessible to the loader 200. Preferably, the accessible bottom part comprises a suitably dimensioned opening in a wall facing toward the mast through which the loader can insert or remove a tote or a tote receptacle with or without a tote into or from the inner console.

According to one preferred embodiment the bottom part of the console has guide rails 509 matching with the tote receptacle, which is a tote frame, such that the tote frame and the tote can be slid into and out from the inner console (see FIG. 8E). These guide rails are easily replaceable and made of highly durable material such as polyoxymethylene, i.e., polyacetal or similar material, which ensures their long life and the capacity to carry maximum weight totes.

According to one preferred embodiment the tote receptacle which preferably is a tote frame is locked to the inner part of the console so that it is impossible to accidentally move the tote frame (FIG. 8E). According to a preferred embodiment the tote frame slides into the guiderails that are positioned inside the inner console. The guiderails are closed on top thus forming a U-form around the tote frame edges so that the tote frame cannot be pulled upwards out of the inner console. The tote frame is preferably also locked via an electric lock 516 so that it cannot move back toward the aisle of the terminal. The lock may also be for preventing a user to remove the frame from the console. The tote frame is preferably also locked via an electric lock so that it cannot move back toward the aisle of the terminal. According to certain embodiment the tote can be removed from the tote frame once the tote frame has been moved into the inner console. According to a preferred embodiment a customer retrieving his/her groceries is not removing the tote but only the items inside the tote. However, according to another preferred embodiment the customer or the courier may pick up the tote and return an empty tote to a dedicated place or replace an empty tote with a full tote. In certain embodiments the tote can be locked to the internal console in such a way that it cannot be removed from the console. On the ceiling or an upper part of the inner console there is a camera 510 for taking pictures of the totes inside the inner console.

According to a preferred embodiment, the terminal has two inner consoles to operate the terminal with greater efficiency by allowing the mast 400 and the loader 200 to operate at one inner console while customer or courier is operating at the other. In a case of two inner consoles, the consoles are located on opposite sides of the short end of the terminal such that the mast moves on a rail between the consoles. According to a preferred embodiment (reference to FIGS. 14A-D), both of the inner consoles may be operated simultaneously: a user may retrieve or insert groceries from both inner consoles one after another, or alternatively a courier may load grocery orders one after another at both of the inner consoles. The essence being that both of the inner consoles can be used parallelly either for loading or for unloading. To allow parallel operation of both consoles, opto-electronic safety light curtains 511 I (FIG. 3B) are placed into the door opening. If these safety light curtains 511 are obstructed, a signal is received by the terminal computing system and the tote frame cannot be moved by the loader. This functionality is also implemented in courier regime: while the courier can remove totes from the terminal, the loader cannot move the tote before the safety light curtains at the door opening are unobstructed. Similarly, the bottom part 508 (including the access opening) of the internal console contains safety light curtains 511 (FIG. 6, FIG. 8E) that need to be unobstructed before the tote frame without a tote can be removed from the inner console. This will also ensure that nothing is in the way of the mast and loader while they move towards the internal console. According to a preferred embodiment the internal console also has optical sensors that detect oversize. These sensors detect oversize while the tote is being pulled to the loader from the internal console. If any oversize is detected the tote is pushed back to the console.

The inner console 505 also has a counter 512. Bottom parts 513 of the sidewalls of the inner console and the counter are preferably made out of brushed stainless steel to ensure high resistance to scratches that can occur during tote switching, these bottom parts of the sidewalls are also placed in such a way that a space is left on the sides of the tote to allow easy access to tote handles so that the placement and removal of the tote is as easy as possible. In essence, this means that the width of the insulated chamber of the inner console is slightly broader than the length of the tote to allow easy access for the customer or the courier to the tote handles.

Inner Frame:

An inner frame 514 of the terminal is constructed inside the shipping container. The inner frame is divided at least into two different temperature zones A and B, shown in FIG. 7. In an alternative embodiment there may be more zones, e.g. A, B, A, or B, A, B etc. According to some embodiments, there may be more than one terminal attached together from their shorter end and each of the terminals have at least one temperature zone. According to one embodiment terminal A may have temperature zone A, and an attached terminal B may have temperature zone B. According to some embodiments, the terminal contains more than two zones, e.g. A, B and C. The at least two zones are separated from each other by insulated walls 501 and sliding doors 502. These temperature zones may be selected to be adjusted to anywhere from −18° C. to +15° C. According to some embodiments, temperature of one or more zones may also kept at ambient temperature. According to one preferred embodiment, one zone has a temperature adjusted to −18° C. for storage of frozen groceries and one zone has a temperature adjusted to +2° C. for storage of dairy products and such. The temperature is controlled via the container's built-in refrigeration unit 20, preferably located at an opposite end of the terminal from the inner console. In a preferred embodiment of this invention, a zone with lowest temperatures is located closest to the refrigeration unit and the zone with highest temperatures is located closest to the inner console. The size of each zone may vary as the size is determined by the position the sliding doors 502 and the insulated walls 501, which are positioned according to needs. These sliding doors open to allow the mast 400 to temporarily enter the low temperature zone for loading or retrieving the tote frames with totes containing groceries requiring low temperature storage to and from post rows in the low temperature zone and return to the higher temperature zone. Once the mast has returned to the higher temperature zone, the sliding doors 502 close. These sliding doors may be operated, for example, by electric motors (not shown) and a rack and pinion drive system (not shown). The sliding doors end positions are confirmed by sensors (not shown).

According to a preferred embodiment, the inner frame 514 comprises shelf posts 403 at a distance from each other such that the distance between the posts is equal to a width of a tote receptacle. The receptacle according to a preferred embodiment is a tote frame, preferably a dip-in tote frame such as shown in FIG. 8B. According to one preferred embodiment, the inner frame may have posts installed at different distances from each other such that tote frames of different width can be used in the terminal for totes of different sizes. According to a preferred embodiment, there is a multitude of support rails 503 attached on both sides of each flat shelf post in such a manner that a multitude of tote frames can be supported between two shelf posts by support rails in both respective shelf posts. The tote frame, according to the most preferable embodiment, is a dip-in frame having four sides framing an empty space suitably dimensioned to hold a tote. It is also to be noted that, in special cases, the totes have metal plates embedded inside the edges of the totes, and that in such a case, no frame is needed, but such totes can directly be placed between the shelf posts 403 and be supported by the support rails 503.

Again, in reference to FIGS. 6 and 7, the shelf posts 403 form two rows inside the terminal and leave a middle aisle for the mast to move between the post rows. In the middle aisle, a top rail 504 is attached onto the ceiling of the terminal and a bottom rail 402 is attached onto the floor of the terminal. Both the bottom and the top rail extends through the terminal from to each temperature zone. The mast 400 moves along the bottom and top rails. The top rail has a U-profile. The bottom rail is a custom profile developed for this terminal. It consists of two U-profiles placed back to back with T-nut slots in between to allow easy mounting of mast drive belt system and adds possibility join two profiles together.

Mast

Still referring to FIGS. 5, 6, a mast 400 configured to move between both of the end walls of the terminal and to elevate and decline the loader 200 to move totes is driven along a bottom rail 402 along an aisle between the shelf post rows. Transmission is achieved through a drive belt running along the bottom rail and being fixed to the rail at both of its ends. At one end of the rail there is a drive belt tensioning system (not shown). Referring to FIGS. 11 and 12A, B, a mast drive motor/mast motor 404 is located on the mast and it moves with the mast. The lower part of the mast comprises a carriage 405, through which the mast is connected to the bottom rail and to the mast's drive belt. The carriage holds the rollers of the drive belt system (not shown) inside the two sides of the carriage, through which power is transmitted to the drive belt. The drive system uses an omega type belt routing to ensure maximum number of belt teeth connecting to the drive wheel and also to make the belt be as close to the mast rail as possible. Both of the omega drive idlers are adjustable to ensure the drive belt runs as linear as possible along the entire length of the machine.

The carriage also holds drive rollers 406, through which the mast is connected to the rail. These rollers are covered with polyurethane layer to ensure longevity and silent movement along the machine. The mast may have different number of rollers depending on the loads of the given mast needs to carry. The rollers are mounted to the carriage in a way that they are easily replaceable.

The mast has a lift which moves the loader vertically along the mast. The lift comprises two beams 417 of which the one closer to the loader is also a linear guide 407 rail for the loader. Also connected to the lift drive belt 408 is a counterweight 409. The counterweight is situated in between the two lift beams. The two beams are connected with each other with metal plates 410 to give the mast its rigidity. Power transmission for the lift is achieved through a belt drive 408 running between the lift beams. Lift drive motor 411 is located next to the mast drive motor. All the idlers 412 of the lift belt system are adjustable to make the belt move as linearly as possible. The belts tension can be adjusted on the loader carriage plate 413 that is moving along the loaders linear guide.

At the upper end of the mast, there are support rollers 414, which drive along a top rail 504 that is fixed to the ceiling of the container to prevent the lateral movement of the mast. These upper rollers 414 allow easy adjustment of the mast to make sure that the mast is perfectly in center of the mast corridor between the shelves. On top of the mast is also located a camera 416 which can see the loader.

Loader

As shown for example in FIG. 11, the loader 200 is located on the mast 400 and it can move up and down along the mast to a desired height to load or unload a tote. In reference to FIG. 10, the loader is positioned over the tote frame and tote. In an alternative embodiment where the system does not have the tote frame the loader is positioned over the tote itself. The loader comprises a main structure 201 that has connection points for all the other loader parts. According to one embodiment the loader may have a cover over the main structure (not shown).

The main structure has a rectangular shape. Along a length of two opposite sides of the main structure there are placed guide rails 202. The dimensions of the rectangular main structure are such that a tote frame or alternatively the tote alone will fit under the main structure, and the location of the guide rails being such that a tote frame with a tote or the tote alone can be supported by the rails. The loader is configured to push and pull tote frames with totes or alternatively the totes alone (i.e. such that the tote frame or an edge of the tote rests on the guide rails) onto and off from the loader, and the main structure allows sliding the tote frame and the tote or the tote alone along the rails. The rails are mounted to the main structure and can be easily replaced, if necessary. The material of the rails is highly durable and strong, such as polyoxymethylene i.e. polyacetal or similar, which ensures their long life and the capacity to carry maximum weight totes. Guide rails 202 have tapered ends to guide the tote frame onto the loader while it is being pulled to the loader.

Referring to FIGS. 9 and 10, underneath the main structure 201 in between and parallel to the guide rails 202 moves a double-sided magnetic head 300 that has two electromagnets 301 facing opposite directions along the moving direction of the loader and pointing towards the shelves on both sides of the loader. This enables tote frames or totes to be picked up from shelves on both sides of the loader. According to one preferred embodiment, the loader is capable of moving tote frames with a tote fixed therein or a tote alone to and from an inner console 505 and to and from the shelf posts 403. The magnetic head 300 is hanging from at least one linear rail 302 attached to the underside of the main structure of the loader. The magnetic head consists essentially of two electromagnets and, multiple pushers 303 and a housing 304 which connects the electromagnets and the pushers. The two electromagnets are facing to opposite directions, such that one is facing toward the direction of one shelf columns and the other in the opposite direction. The electromagnets are capable of moving in relation to the housing 304, which makes it possible to compensate for any potential tote frame—or loading—position inaccuracies. The magnetic head moves to the end of the linear guides to an extent that is necessary to reach across the edge of the loader to grab tote frames or totes placed on a shelf (by shelf it is meant here the location between two shelf posts where the tote frame or tote can be supported by the guide rails of the shelf posts) in both end positions of the magnetic head. The pushers are located on the sides of the electromagnets. The pushers are connected to a sensor 305 that provides a signal to define whether or not the tote frame is attached to the electromagnet. The pushers also help to push the tote frame or tote away from the electromagnet if any residual magnetism should occur, so as to ensure that the tote frame or tote is not attached to the magnetic head when the loader starts moving away from the shelf.

The magnetic head is moved via an electric motor 203 and drive belt system 204. The electric motor and the drive belt are preferably located on the upper side of the loader. The drive belt has easy access adjustment screws 205 on both ends of the loader that allow to change the angle of the endmost rollers of the drive belt system to ensure that the movement of the drive belt is as linear as possible and also to adjust the tension of the belt. The drive belt system with rollers is placed between two plates 206 that stretch along the entire length of the loader.

The energy chain 207 of the magnetic head is located beside the magnetic head. There is a home sensor 208 for the magnetic head at one end of the loader.

There is at least one position sensor 210 outside loaders main structure detecting the position of the tote frame on the loader as well as whether or not a magnet is holding the tote frame.

On top of the loader is located a junction box 211 that collects all the sensor signals that are generated on the loader.

As shown in FIG. 11, the loaders main frame is attached to the mast via hanging brackets 401 that connect the loaders main structure. These hanging brackets also allow adjustment of the loader in all axes so as to guarantee straight loading and unloading of the tote frame.

Tote Frame and Tote

The automated grocery terminal uses standard grocery totes 100 to store goods inside the terminal. In certain embodiments, the totes may come in different sizes preferably based on their depth, but also the length may differ. According to a preferred embodiment, to accommodate totes with different lengths different sized tote frames may be used. The frame may also be adjustable for different sized totes. The frame is also called here receptacle. Referring to FIGS. 8A-E, according to a preferred embodiment the frame has four sides a, b, c, d such that the sides leave an empty space e in the middle to adapt a tote dipped into the empty space. Such a tote frame is called here dip-in-tote frame. The totes are not by default locked into the frame, which allows removing the tote from the frame when the frame with a tote is brought into the inner console. The frame has a metal plate 102 on one edge. The steel plate is used as an attachment point for an electromagnet 301 that is used to move the frame with the tote perpendicularly to mast movement. The frame can be made of different materials including but not limited to steel, stainless steel and different thermoplastics and composites. According to one embodiment (FIG. 8D), the terminal does not have tote frames at all but pulling the tote onto and from the loader takes place with, for example, mechanical hooks that pull the tote or rollers that use friction to move the tote to and from a shelf, or in some embodiments of this invention the totes have metal plates molded into their sides so that the electromagnet can directly connect to the tote. Examples of the loader in work are provided below.

Case 1 Loading a Tote to the Loader from a Shelf

The loader is empty i.e. it is not holding a tote frame and a tote. The loader moves up to a predetermined tote placed on a shelf. The magnetic head of the loader moves into an end position, during which the electromagnet and pushers move against the steel plate of the tote frame. The electromagnet is activated, and the pushers are now level with the electromagnet, so the sensor sends out a signal to indicate that the tote frame is attached to the magnet. The magnetic head moves toward the other end of the loader until the tote frame is fully resting on the guide rails of the loader. Once the tote frame and the tote are attached to the loader, the mast may begin to move.

Case 2. Moving a Tote from a Shelf to an Inner Console

A tote frame with a tote has been pulled to the loader (i.e. the frame is resting on the guide rails underneath the loader) from a shelf on the left or right side of the terminal and is brought by movement of the mast to the inner console that locates on the same side of the terminal as the shelf from which the tote was retrieved. The tote frame with the tote is pushed into the inner console through the opening in the console wall by the magnetic head that moves toward its end position. Once the magnetic head has reached the end position the tote is fully inside the inner console such that the tote frame fully rests on the guide rails in the inner console. In case the tote was empty and the system is on courier mode, the courier will fill the tote with orders or alternatively pick up the empty tote and exchange it with a tote that is prefilled with customer orders and once the tote has been loaded, it is moved back to the loader. In case the tote was full and the system is on item retrieval mode, the customer picks the items from the tote or alternatively picks the full tote, and once the tote is empty or the frame no more contains the tote, the frame with empty tote or an empty frame is pulled back to the loader. Once the tote frame and the tote or the empty frame is on the loader, it is placed back onto a shelf on the same side from which it was taken from. According to one embodiment the tote may not be removed from the inner console when the system is on retrieval mode (customer mode) but the customer may only pick up the items from the tote. According to one preferred embodiment if the customer tries to remove the tote an alarm may be activated. According to another embodiment the tote may be locked via a solenoid to the inner console when the system is on customer mode.

In reference to flow charts in FIGS. 14A-D A detailed description of the method to load and unload grocery orders to and from the terminal is now described:

Retrieval of Grocery Order

Referring to FIG. 14B as retrieval of a single tote by a customer: The motion detector of the user console detects an approaching user. Instructions for entering a PIN code or scanning a QR code are displayed on the screen for the user. Upon identifying as a customer, the system will switch from idle mode to retrieval (customer mode) or alternatively the system is by default on retrieval mode. The information is transferred to a processor locating the desired tote in the terminal and providing information to the mast and loader system to retrieve the identified tote from the identified location. Once the desired tote is loaded to the loader as described above the mast moves to the inner console, the loader is ascended to the level of the inner console entry and the loader loads the tote frame with the tote into the inner console which is on the same side of the terminal as the shelf from which the tote was retrieved. Once the system detects (sensors, cameras) the tote frame and the tote in the console, information is sent to the processor which allows the outer door lock to be opened and the customer can retrieve the groceries from the console.

Referring to FIG. 14D for retrieval of multiple totes by a customer: If customer has several totes with orders (e.g. one tote with items that are stored in cold zone and one tote with items stored in warmer zone, or several totes in same temperature zone), the mast will move to retrieve the second tote immediately after the first tote is inserted into the inner console; i.e. the mast moves to retrieve the second tote while the customer empties the first tote at the first inner console. Now the second tote is brought into the second inner console. However, as long as the customer is working at the first inner console retrieving his groceries from the first tote, the inner console door of the second console remains closed. Only upon the customer confirming from the user console input device that the first tote is empty will the door of the second inner console open and at same time the first inner console door is locked again. If the customer has still more totes with orders, then the system according to a preferred embodiment retrieves the empty tote from the inner console while the customer empties the full tote in the second inner console. Similarly, later when the customer empties the third tote at the first inner console the system retrieves the empty tote from the second inner console. Immediately after the empty tote has been retrieved from the first console, the system will locate a third tote be retrieved still while the customer works on the second inner console and the mast again brings a third tote to the first inner console (which now is empty) and the door of the first inner console remains closed until customer has confirmed on the user console input device that the tote is empty. Parcel retrieval is continued until all the totes with customer orders are emptied.

Because the mast and the loader are so constructed that a tote can only be loaded into an inner console on the same side as the shelf from which the tote was picked, it is necessary that the mast and loader picks every other tote from one side and every other tote from the other side of the aisle. In practice this means that when there are multiple totes for one customer they have to be loaded in such a manner that the first tote is on one side of the aisle and the second tote is on the other side of the aisle, third tote is on same side as the first one, and fourth is on same side as the second and so on. If there are more totes for the customer, the totes have to be loaded such that every second is on one side and every second is on the other side. This will apply even if the totes would be in different temperature zones. When the totes are in different temperature zones, the sliding door between the zones will open upon the mast is programmed to move from a temperature zone to another. The sliding door will be closed again when the mast moves back to the first zone.

The process is continuing until all totes with customer orders are taken out. If customer has emptied the last tote, closed the door and then the door locks and customer can leave from the terminal.

If customer has different code with different order, then customer scans or enters the order code and the process is started from the beginning.

According to a preferred embodiment, when there are more than two orders to be retrieved, the system has to move empty totes resulting from customer retrieving his/her groceries at one of the inner consoles back to the terminal. This takes place always while the customer is emptying his orders at the other inner console. Preferably the mast/loader picks up the empty tote from the first inner console, customer works on the second inner console and brings the empty tote to the terminal and loads on the shelf of same side as the first inner console. Then immediately the system locates the position of the next tote to be picked up and the mast moves there (this location has to be on the same side as the first inner console because at his point the customer works at the second inner console). Once the customer works at the first inner console the mast/loader retrieves the empty tote from the second inner console and brings it to the terminal before retrieving next order to the second console.

Entering Grocery Orders

Referring to FIG. 14A for entry of grocery orders into the terminal by a courier: The motion detector of the user console detects an approaching user. Instructions for entering a PIN code or scanning a QR code are displayed on the screen for the c user. Upon user identifying as a courier the system swifts to courier mode (loading mode). The door(s) of one or both of the inner consoles are opened, and courier can lock the doors into open position to enable faster parcel entry—no need to open and close the doors during fast entry. Courier safety is ensured with safety light curtains at the inner console, and when anything inserted into the inner console while a tote is pushed into or pulled from the inner console, the terminal stops. When the system is on courier mode (loading mode) the courier can obstruct the safety light curtains in the inner console and the mast will not stop moving even when the courier works at the inner console.

In courier mode, the courier first scans the order code, then the mast with the loader brings an empty tote into an inner console. When the empty tote is fully inside the inner console, the courier inserts the ordered goods into the empty tote or alternatively switches the empty tote to a tote prefilled with customer orders. Then courier enters on the input device which temperature zone the tote is to be stored. After courier has selected the temperature zone, the loader pulls the tote with ordered items to the loader and the mast moves to the temperature zone chosen and the tote is stored on a shelf. The information of the location of the tote is saved in the computerized system.

Referring to FIG. 14B for entry of multiple orders via two consoles: If the order requires more than one tote to be filled (e.g. different temperature zones required, or more items ordered than fits in one tote), then while the courier is filling in the tote at the first inner console the mast brings another empty tote from an opposite shelf to the second inner console. While the courier fills in the tote on the second inner console, the full tote at the first inner console is retrieved by the loader and moved to storage at a shelf on the same side as the first inner console at required temperature zone. Still while the courier works on the second inner console the system brings an empty tote to the first console. After courier confirmation of the second tote at the second inner console to be finalized, the tote is pulled to the loader and the mast moves the tote with an order on to a shelf in selected temperature zone. Simultaneously the courier already fills in the empty tote in the first console. The process is continued until all totes with customer orders are inserted into terminal. If courier has other customer orders, then the process is repeated by scanning order code and inserting totes with orders until all order is inserted into terminal. Loading is possible until there are no more free shelves in required temperature zones.

ELEMENT LISTING

1—grocery terminal
2—server
3—communications device
10—outer shell
10a—back doors of outer shell
11—top
12—bottom
13—back end
14—front end
15—longitudinal wall
20—temperature controlling or refrigeration unit
100—grocery tote
100a upper edge of the tote
101—special dip-in tote frame (to accommodate various tote sizes)
101 a, b, c, d frame side rails
101 e empty space of the frame to dip the tote in
102—metal plate (attachment point for electromagnet)
200—loader
201—"main structure" of loader
202—guide rails (tote moves along these)
203—electric motor
204—drive belt system
205—adjustment screws (to adjust the angle of endmost rollers)
206—two plates (drive belt is placed between these)
207—energy chain of magnetic head
208—home sensor
210—position sensors (detects tote position and determines whether magnet is holding onto tote)
211—junction box (collects all sensor signals generated on the loader)
220—open end of the loader
230—closed side of the loader
300—double sided magnetic head
301—electromagnet (2 of them)
302—linear guide rails (magnetic head hangs from this)
303—pushers (4 of them, part of magnetic head)
304—housing (joins the assembly together)
305—sensor (helps determine whether platform is attached to magnet)
400—mast
401—hanging brackets (connects loader main structure to mast lift module)
402—bottom rail (mast can slide along this)
404—mast drive motor
405—carriage (connects bottom rail and drive belt)
406—drive rollers (connects mast to rail)
407—linear guide rail
408—lift belt drive
409—counterweight
410—metal plates (support structures for mast, give the structure rigidity)
411—lift drive motor
412—idlers (adjustable)
413—loader carriage plate
414—upper support rollers (allows adjustment of mast to center it)
415—homing sensor
416—camera (records and allows videos stream of loader operations)
417—lift beam
501—insulated walls (separates the temperature zones)
502—sliding doors (allows for movement into/out of the temperature zones)
403—shelf posts
503—support rails (supports tote frames)
504—top rail (for guiding the mast, 402 bottom rail)
505—inner consoles (2 of them)
506—inner console door
507—insulated chamber
508—bottom part of inner console having access opening (accessed by loader)
509—guide rails for tote frame
510—camera (records and allows video stream of the inner console)
511—safety light curtains
512—counter
513—bottom parts of sidewalls of inner console
514—inner frame
515—advertisement space
516—lock
517—lock latch bolt
600—user console
601a, b—end-user scanners
602—touch screen assembly
603—console dome cameras
604—LED lights
605—viewing window
606—instrument unit (houses a cover plate which hides motion sensors and the conference call system)
607—console roof

What is claimed is:

1. An autonomous grocery storage and retrieval terminal comprising:
a transportable temperature-controlled container having a top, a bottom, two longitudinal walls, a back end, a front end, and a temperature controlling unit;
a user console attached to the front end of the container, said user console comprising at least an input device for receiving an input from a user for loading or retrieving one or more grocery orders;
the container and the user console together forming an outer shell of the terminal; an inner frame inside the outer shell, the inner frame comprising:
at least one temperature zone, two longitudinal rows of shelf posts along the longitudinal walls forming shelves, and a longitudinal aisle between the rows, and the shelf posts being configured to hold a multitude of totes, tote receptacles-coupled to totes, or tote receptacles without totes,
two inner consoles at the front end of container located on opposite sides of the aisle, each having an access opening facing toward the aisle, and a lockable inner console door providing an access to the inner console from outside the terminal to receive or load the grocery orders, a mast configured to move along the aisle on a bottom rail, and a loader attached to the mast, the loader being configured to move vertically along the mast and pull out a tote, a tote receptacle coupled to a tote, or a tote receptacle without a tote from a shelf and attach on top of the tote or the tote receptacle via guide rails located on a lower side of the loader such the tote, or the receptacle is resting underneath the loader, and the mast and the loader being configured to move the tote, the tote receptacle coupled to the tote, or the tote receptacle without a tote through the access opening into the inner console located on same side of the aisle as the shelf from which the tote or the receptacle was pulled out, the loader further being configured to pull out a tote, a tote receptacle coupled to a tote, or a tote receptacle without a tote from either of the inner consoles through an access opening and move the tote, the receptacle coupled to the tote, or the tote receptacle without the tote to a shelf on same side of the aisle as the inner console from which the tote, or tote receptacle was pulled out; and the terminal further comprising a controller, and a server in communication with a database for tracking at least one grocery tote within the terminal, and the controller being in communication with the server and the server updating the database regarding location of totes in the terminal.

2. The grocery storage and retrieval terminal of claim 1, wherein the totes or the tote receptacles comprise a metal plate, and the loader has a magnetic head configured to move in a direction perpendicular to the shelf rows;

the magnetic head is configured to attach to the metal plate, and the movement of the magnetic head configured to cause:

pushing or pulling the tote, or the tote receptacle to and from the shelves, or to and from the inner console through the access opening.

3. The grocery storage and retrieval terminal of claim 1, wherein the transportable container is a shipping container.

4. The grocery storage and retrieval terminal of claim 1, wherein the temperature control comprises a refrigeration unit.

5. The grocery storage and retrieval terminal of claim 1, wherein the user console is hingeably attached to the front end of the container.

6. The grocery storage and retrieval terminal of claim 1, wherein the tote receptacles are dip-in-tote frames.

7. The grocery storage and retrieval terminal of claim 1, wherein the terminal has at least two different temperature zones separated from each other by a sliding door.

8. The grocery storage and retrieval terminal of claim 1, wherein the inner console doors are automated and controllable via a smart device, whereby handover of the orders is contactless.

9. A computerized system to store and retrieve grocery orders in and from a grocery storage and retrieval terminal having a multitude of temperature zones, wherein the system comprises:

at least one row of parallel shelf posts forming shelves, said posts being arranged such that a multitude of grocery totes, tote receptacles coupled to grocery totes, or tote receptacles without a totes can be supported between the posts, wherein the at least one row of parallel shelf posts extends through the multitude of temperature zones, and the system further comprises a user interface and computer controls for controlling a vertical mast having an upper and a lower end and being supported by a bottom and a top rail and moving horizontally along the rails in front of the at least one row of parallel shelf posts, and a loader configured to attach a grocery tote, a tote receptacle coupled to a grocery tote, or a tote receptacle without a tote underneath a main structure of the loader, wherein the loader is attached to the mast and being configured to move vertically along the mast to retrieve or insert grocery totes from or to a shelf in a predetermined temperature zone.

10. The system of claim 9, wherein the system comprises at least two different temperature zones.

11. A computer-controlled method to retrieve or insert multiple grocery orders from or to a grocery storage and retrieval terminal, the method comprising:

the terminal with an input device and computer implemented controls;

the terminal comprising two rows of shelf post configured to hold a multitude of grocery totes or tote receptacles coupled to grocery totes, a longitudinal aisle in between the rows, a vertically moving loader attached on a mast configured to move along the aisle, wherein vertical movement of the loader and horizontal movement of the mast can be simultaneous, and wherein the terminal further comprises two inner consoles located inside the terminal at same end of the terminal on opposite sides of the aisle for retrieving and loading grocery orders, said method comprising the steps of:

a) selecting a retrieval or a loading mode based on identification information entered by a user at the input device;

b) upon entering the retrieval mode, initiating movement of the mast along the aisle to a location at the shelf post rows where a tote containing a first order is located, or upon entering loading mode initiating movement of the mast along the aisle to a location at the shelf post rows where an empty tote is located;

c) initiating vertical movement of the loader to a level of the tote containing the first order or to the empty tote and initiating the loader to pull out the tote and initiating the loader to attach to the receptacle coupled to the tote or directly to the tote such that tote is attached underneath the loader;

d) initiating the mast with the tote attached underneath the loader to move along the aisle to the first of the two inner consoles located on the same side of the terminal as the shelf from which the tote was retrieved;

e) initiating the loader to push the tote or the tote with the receptacle into the first of the two inner consoles through an access opening;

f) causing the first inner console door to unlock for the user to open the door and retrieve the first order from the tote located in the first inner console, or the user to load the items of a first order into the empty tote in the first inner console;

g) locking the first inner console upon receiving information that the user closed the door of the first inner console and receiving confirmation from the user input device that retrieval of items at the first inner console is finalized or that loading of items at the first inner console is finalized;

h) simultaneously with step f)) identifying a second tote with a second order or a second empty tote located on the opposite row of shelf posts than the tote with the first order or the first empty tote, and initiating the mast to move along the aisle to the location where a tote containing the second order, or the second empty tote is located;

i) initiating vertical movement of the loader to a level of the tote containing the second order, or the second empty tote, and initiating the loader to attach to the receptacle coupled to the tote or directly to the tote such that tote is attached underneath the loader;

j) initiating movement of the mast with the tote attached underneath the loader along the aisle to the second of the two inner consoles on the same side of the aisle as the shelf from which the second tote was retrieved;

k) initiating the loader to push the tote or the receptacle with the tote into the second inner console through an access opening;

l) initiating the second inner console door to unlock after which the user can open the door and retrieve the second order from the second inner console, or the user can load the items of a second order to the empty tote at the second inner console;

m) locking the second inner console upon receiving information that the user closed the door of the second inner console, and receiving confirmation from the user input device that retrieval of items at the second inner console is finalized, or that loading of items at the first inner console is finalized;

n) simultaneously with step l)) initiating the mast and the loader to remove the full tote or the empty tote from the first inner console and transport the tote to an empty shelf located on the same side of the aisle as the first inner console for storage;

o) repeating steps b-g) for a third order;

p) repeating steps h-m) for a fourth order;

q) repeating steps b-n) until each of the grocery orders are picked up or each of the grocery orders are filled in.

12. An arrangement for moving grocery totes within a grocery storage and retrieval terminal, said arrangement comprising:

a horizontally moving mast, and a vertically moving loader attached thereto, wherein the loader comprises:

a rectangular main structure having two open ends, and two closed sides, each of the closed sides having a guide rail on their lowermost part and a distance between the guide rails being such that a grocery tote or tote receptacle coupled tom a tote can be supported by the rails;

a magnetic head having two electromagnets, each of the electromagnets facing toward one open end of the main structure, and the magnetic head hangs on a linear rail located underneath the main structure in between of, and parallel to the guide rails, and the magnetic head is configured to move along the linear rail between the open ends, wherein the magnetic head is further being configured to attach to a tote or a tote receptacle, wherein upon moving the magnetic head along the linear rail, the magnetic head pulls a grocery tote or a grocery tote coupled to the tote receptacle through one open end of the loader along the guide rails to underneath the main structure, or pushes the grocery tote or the tote coupled to the tote receptacle out from one open end of the loader along the guiderails to a selected location; and wherein the loader is configured to move vertically along the mast to a height such that one open end is adjacent to the selected location for the magnetic head to push the grocery tote to the location, or to pull a grocery tote from the location to the loader along the guiderails.

* * * * *